US009029778B1

(12) United States Patent
Boyd et al.

(10) Patent No.: US 9,029,778 B1
(45) Date of Patent: May 12, 2015

(54) SHORT STANDOFF CHECKPOINT DETECTION SYSTEM

(71) Applicant: Telesecurity Sciences, Inc., Las Vegas, NV (US)

(72) Inventors: Douglas P. Boyd, Las Vegas, NV (US); Steven A. Johnson, Salt Lake City, UT (US); David T. Borup, Salt Lake City, UT (US); James W. Wiskin, Salt Lake City, UT (US); Manuel Berrondo, Orem, UT (US)

(73) Assignee: Telesecurity Sciences, Inc., Las Vegas, NV (US)

( * ) Notice: Subject to any disclaimer, the term of this patent is extended or adjusted under 35 U.S.C. 154(b) by 81 days.

(21) Appl. No.: 13/667,861

(22) Filed: Nov. 2, 2012

Related U.S. Application Data

(60) Provisional application No. 61/555,709, filed on Nov. 4, 2011.

(51) Int. Cl.
  *G01J 5/02* (2006.01)
  *G01J 3/42* (2006.01)
(52) U.S. Cl.
  CPC ........................................ *G01J 3/42* (2013.01)
(58) Field of Classification Search
  CPC .............. G01V 8/005; G01J 3/42; G01J 9/04; G01S 13/887; G01N 21/3563; G01N 21/3581; G01N 2201/10
  USPC ............................................ 250/341.1–341.8
  See application file for complete search history.

(56) References Cited

U.S. PATENT DOCUMENTS

| | | | | |
|---|---|---|---|---|
| 4,918,315 A | * | 4/1990 | Gomberg et al. | ........ 250/390.04 |
| 5,202,692 A | * | 4/1993 | Huguenin et al. | ............ 342/179 |
| 5,227,800 A | * | 7/1993 | Huguenin et al. | ............ 342/179 |
| 5,339,282 A | | 8/1994 | Kuhn et al. | |
| 5,588,032 A | | 12/1996 | Johnson et al. | |
| 6,005,916 A | | 12/1999 | Johnson et al. | |
| 6,587,540 B1 | | 7/2003 | Johnson et al. | |
| 6,636,584 B2 | | 10/2003 | Johnson et al. | |
| 7,449,695 B2 | * | 11/2008 | Zimdars et al. | ............ 250/341.8 |
| 7,570,742 B2 | | 8/2009 | Johnson et al. | |
| 7,699,783 B2 | | 4/2010 | Hanover et al. | |

(Continued)

OTHER PUBLICATIONS

Wiskin, J., et al. "Full Wave, Non-Linear, Inverse Scattering: High Resolution Quantitative Breast Tomography," Acoustical Imaging vol. 28 pp. 183-194, 2007, Dordecht, Netherlands.

(Continued)

*Primary Examiner* — Kiho Kim
(74) *Attorney, Agent, or Firm* — Workman Nydegger

(57) ABSTRACT

Detecting characteristics of a test subject at a checkpoint. Embodiments may include exposing a single test subject to electromagnetic radiation at a security checkpoint. They may further include determining how the electromagnetic radiation interacts with different portions of the single test subject. They may further include determining different material properties for the different portions of the single test subject by examining how the electromagnetic radiation interacts with the different portions of the single test subject. They may further include providing an indication of the different material properties of the different portions of the single test subject, wherein providing an indication of the different material properties of the different portions of the single test subject comprises distinguishing between different material properties.

18 Claims, 13 Drawing Sheets

(56) References Cited

U.S. PATENT DOCUMENTS

| | | | |
|---|---|---|---|
| 7,771,360 | B2 | 8/2010 | Johnson et al. |
| 7,795,583 | B1* | 9/2010 | Hubbard et al. ........... 250/338.1 |
| 7,841,982 | B2 | 11/2010 | Johnson et al. |
| 8,654,922 | B2* | 2/2014 | Bendahan ........................ 378/63 |
| 2003/0139662 | A1* | 7/2003 | Seidman ........................ 600/407 |
| 2006/0009693 | A1 | 1/2006 | Hanover et al. |
| 2006/0287596 | A1 | 12/2006 | Johnson et al. |
| 2006/0293597 | A1 | 12/2006 | Johnson et al. |
| 2007/0235658 | A1* | 10/2007 | Zimdars et al. .......... 250/390.07 |
| 2008/0204747 | A1* | 8/2008 | Emmerson et al. ........... 356/328 |
| 2011/0129063 | A1* | 6/2011 | Bendahan ........................ 378/57 |
| 2012/0176237 | A1* | 7/2012 | Tabe ........................ 340/539.12 |

OTHER PUBLICATIONS

Bigelow, T. A., et al, "Estimation of Total Attenuation and Scatterer size from Backscattered Ultrasound Waveforms," Journal of Acoustical Society of America, vol. 117, Issue 3, pp. 1431-1439, Mar. 2005.

Miranda. A. A., et al, "New Routes from Minimal Approximation Error to Principal Components," Neural Processing Letters, vol. 27, Issue 3, Jun. 2008.

Piepmeier, J. R., et al, "Stokes Antenna Temperatures," IEEE Transactions on Geoscience and Remote Sensing, vol. 46, Issue 2, pp. 516-527, 2008.

* cited by examiner

SHORT STANDOFF CHECKPOINT DETECTION SYSTEM

CROSS-REFERENCE TO RELATED APPLICATIONS

This application claims the benefit of U.S. Provisional application 61/555,709 filed Nov. 4, 2011 titled "PASSENGER SCANNING IMAGING-SYSTEMS FOR DETECTING CONTRABAND", which is incorporated herein by reference in its entirety.

BACKGROUND

Background and Relevant Art

Premises security has, in recent times, become an important concern. In particular, there is a desire to ensure the safety of persons and property in various situations. For example, it is important to ensure that explosive devices and other contraband are not smuggled into airports, sporting venues, government buildings, etc.

Premises security has typically been performed using tools which provide a qualitative analysis of test subjects. For example, a metal detector may indicate the presence of metal for a test subject. However, the metal detector will typically not indicate a quantitative indication of a plurality of different materials. For example, the metal detector will not indicate the quantities of different metals, the quantity of metal as compared to the quantity of dielectric material or conductivity of a test object, etc. Rather, the metal detector will simply indicate the presence of metal on a test subject, with all metal being treated nearly uniformly irrespective of the type of metal being detected.

Similarly, so called millimeter-wave scanning devices have been employed to perform scanning of test subjects using exposure to electromagnetic energy. An analysis is made of electromagnetic energy reflected from the test subject to determine anomalies with respect to the Again, the results of such an analysis is a qualitative result indicating the presence of an anomaly rather than a quantitative result indicating differences in different portions of a test subject. For example, the so called millimeter-wave scanning device will output a black and white or gray-scale image. An anomaly can be detected by detecting irregular shapes of the test subject, with additional clues from gray-scale levels. However, analysis using such devices is not able to discern the difference between many different materials. For example, images may show similarly shaped plastic and metal objects in almost exactly the same way, but where there is little indication of differences for different materials of the same test subject.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments may include detecting characteristics of a test subject at a checkpoint. These embodiments may include exposing a single test subject to electromagnetic radiation at a security checkpoint. They may further include determining how the electromagnetic radiation interacts with different portions of the single test subject. They may further include determining different material properties for the different portions of the single test subject by examining how the electromagnetic radiation interacts with the different portions of the single test subject. They may further include providing an indication of the different material properties of the different portions of the single test subject, wherein providing an indication of the different material properties of the different portions of the single test subject comprises distinguishing between different material properties.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
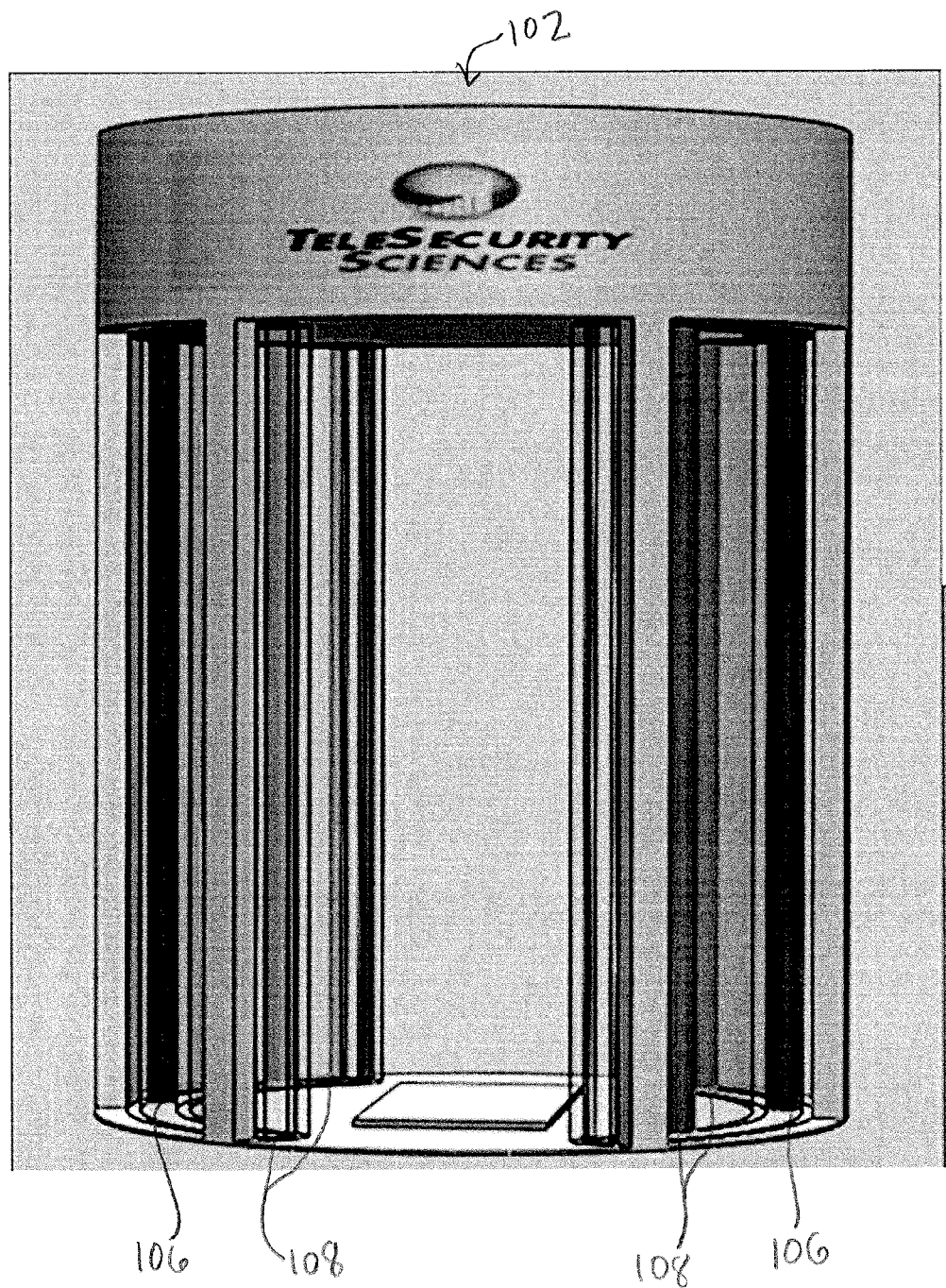
FIG. 1A illustrates a front view of a scanning device.

Some embodiments described herein implement technology that allows for quantitative indications of a plurality material properties for test subjects that include the plurality of different materials. In particular, some embodiments may use inverse scattering to determine material properties of discrete portions of the test subject. For example, in some embodiments, material properties may be determined at a voxel level. Material properties can be indicated in a quantitative fashion. For example, a complex index of refraction may be indicated for various portions of the test subject. Differing material properties can then be used to automatically indicate a threat or the presence of contraband.

Testing may be performed using electromagnetic radiation, such as millimeter-wave radiation. However, in contrast to current millimeter-wave radiation, some embodiment may use inverse scattering to detect different material properties. Further, some embodiments may use both normally directed radiation and obliquely directed radiation to facilitate a layered analysis of a test subject.

Embodiments may implement an Advanced Imaging Technology (AIT), millimeter wave (MMW) scanning method to distinguish explosives or contraband from benign objects, including adjacent or overlapping objects on individuals or other test subjects. One advantage that some embodiments may exhibit over other millimeter wave scanners is that embodiments may combine the dual capability of classifying material by high resolution 3-D, reflection imaging with a new unique classifying approach based quantitative, Inverse Scattering Tomography (IST), 3-D imaging. Some embodiments may be implemented using the w-band radiation frequency bandwidth of 35 GHz with a center frequency of about 92 GHz (as compared to 16 GHz and 23 GHz respectively for the other millimeter wave scanning systems). Embodiments may have a lateral resolution of about 4.2 millimeter and a depth resolution of about 2.1 millimeter (as compared to 17 millimeter and 10.7 millimeter respectively for other millimeter wave systems). Another embodiment may use radiation from 50 GHz to 75 GHz in the popular V-band (where components are less expensive than those for w-band.

The IST method employs a nonlinear operator to invert multiple scattering at multiple frequencies to form images that are more free from distortion and artifacts than previous scanning technologies. Embodiments may create one or more of three image types for each test subject: a refractive index image, electrical conductivity image and reflectivity image.

An additional feature of scanner embodiments described herein, not found in others, is its potential to scan targets using linear polarized waves (both vertical V and horizontal H). This enables the use of the Fresnel formulas to compute the millimeter wave refractive index $n_m = c_o/c_m$. The Fresnel formulas permit better detection of wedge shaped edges or sloping sides of bulk material such as explosives and drugs. An embodiment device can thus be sensitive to surface and volume structures and texture.

The above imaging features allow better use of computer aided detection (CAD) algorithms because of improved spatial resolution and three or more nearly independent material characterizing parameters. This in turn improves material segmentation.

The resulting improved rejection of false positives and false negatives by CAD can improve performance related to detecting threats or contraband while simultaneously lowering labor costs and reduce image reader fatigue.

IST imaging methods can provide significant advantages and superiority over previous methods including one or more of the following: (1) automatic true registration with lab or reference coordinates; (2) refraction correction; (3) energy-loss correction; (4) multiple scattering correction; and (5) quantitative, 3-D imaging of the bulk material properties of real permittivity $\epsilon'$ and electrical conductivity $\sigma$. Present active millimeter (or micro) wave whole body scanners only make a qualitative un-corrected image. Embodiments may provide for higher resolution, in depth and laterally, than other scanners.

While embodiments described herein may provide enhanced functionality over previous systems, these enhancements may come at a cost. In particular, embodiments may use more complicated mathematical theory, be more complex, and require greater computational power than previous systems. However, some of this can be mitigated. In particular, the TM mode (with electric field parallel to the subject's spine, i.e., V polarization) has a scalar wave equation which matches the Helmholtz equation for acoustics (e.g. ultrasound). V polarization will mitigate IST imaging algorithms concerns for the millimeter wave scanner. The second risk mitigation is that the addition of H polarization to V data will increase well posedness because 2 independent variables (V and H) are sampled by 3 independent measurements (VV, VH=HV, HH). The V cross H polarization sees surface and volume texture.

The high level of performance required by IST hardware and algorithms with high spatial resolution is addressed by: (1) 1st level algorithms based on ray theory; (2) follow-on wave theory algorithms to further boost performance; and (3) innovative, low noise radar equipment and antenna design, such as that available from Sierra Nevada Corporation (SNC) of Sparks, Nev., or from Mi-wave, Largo, Fla.

Some embodiments may implement a millimeter wave, scanning portal gate or premises security system which has the following unique features:

1. high lateral spatial resolution by use of a higher center frequency than current scanners.

2. high depth spatial resolution by use of wider bandwidth frequency spectrum than current scanners.

Figure 3:
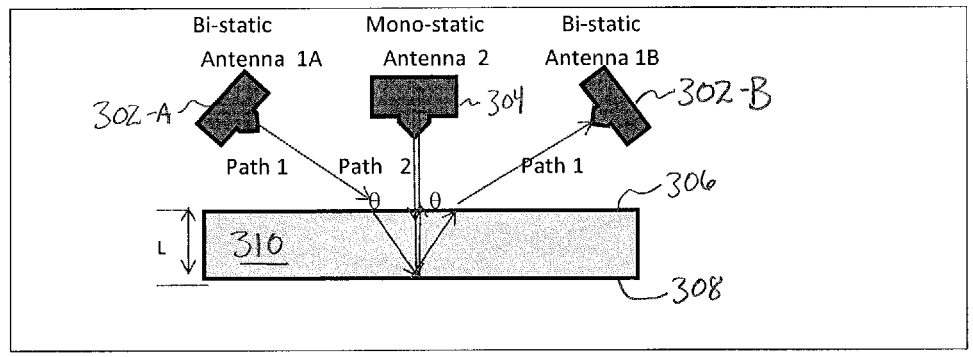
FIG. 3 illustrates an antenna geometry.

3. Quantitative imaging of bulk electromagnetic material properties by use of inverse scattering for ray-based wave-based inversion theories. Such ray-based theories can be found in U.S. Pat. No. 6,636,584 titled "Apparatus And Method For Imaging Objects With Wavefields" issued on Oct. 21, 2003 which is incorporated herein by reference in its entirety. Ray-based imaging tasks and elements include:

a. Computed product $[\sigma(x)c(x)]$, where $\sigma(x)$ is local absorption $c(x)$, is local speed of light and x is a 3-D vector on the surface of the body or extending normal into or out of the body.

b. A scanner geometry for generating four mono- and bi-static equations (shown below) is implemented. Such a geometry is illustrated in FIG. 3 discussed in more detail below. On solving these four equations for $c(x)$ and $\sigma(x)$, embodiments derive a quantitative material measure: $c(x)\sigma(x) = [\ln(I_1/I_2)]/(t_1/t_2)$.

c. Including transmission ($T_1$, $T_2$) and reflection coefficients ($R_1$, $R_2$) for paths 1 and 2 gives:

$$\sigma(x)c(x) = \left[\ln\left(\frac{I_1}{I_2}\right) - 2\ln\left(\frac{T_1}{T_2}\right) - \ln\left(\frac{R_1}{R_2}\right)\right] / (t_1 - t_2)$$

d. Produce images of the local EM phase of light (i.e. millimeter wave speed) $c_F(x)$ by analysis of the Vertical (V) and Horizontal (H) Fresnel reflection coefficients $r_V(\theta)$ and $r_H(\theta)$ as a function of incident and reflection angle in both V and H polarizations. Then find $\sigma(x)=[\sigma(x)c(x)]/c_F(x)$ e. Produce simulated images of the heuristic, unit-less reflection coefficient given by $(r_H/r_V)$, $r_H/(r_H+r_V)$, $r_H/(/r_H+r_V)$, and $2(r_V-r_H)/(r_V+r_H)$ and their texture/statistical (moments) variants.

4. Use of wave-theory-based inverse scattering to produce more accurate and artifact-free imaging methods than ray-based methods or by other technologies. IST imaging of real permittivity and electrical conductivity of laboratory objects (wood, plastic, etc.,) has been performed by mathematically inverting the combined electromagnetic wave equation components shown in TABLE A.

TABLE A

Inhomogeneous electromagnetic wave equation components.

$$\nabla^2 \varphi - \frac{1}{c^2}\frac{\partial^2 \varphi}{\partial t^2} = -\frac{\rho}{\varepsilon_0} \quad \nabla^2 A - \frac{1}{c^2}\frac{\partial^2 A}{\partial t^2} = -\mu_0 J \quad E = -\nabla\varphi - \frac{1}{c}\frac{\partial A}{\partial t}$$

$$B = \nabla\phi + A \qquad \frac{1}{c}\frac{\partial \varphi}{\partial t} + \nabla \cdot A = 0$$

Figure 1B:
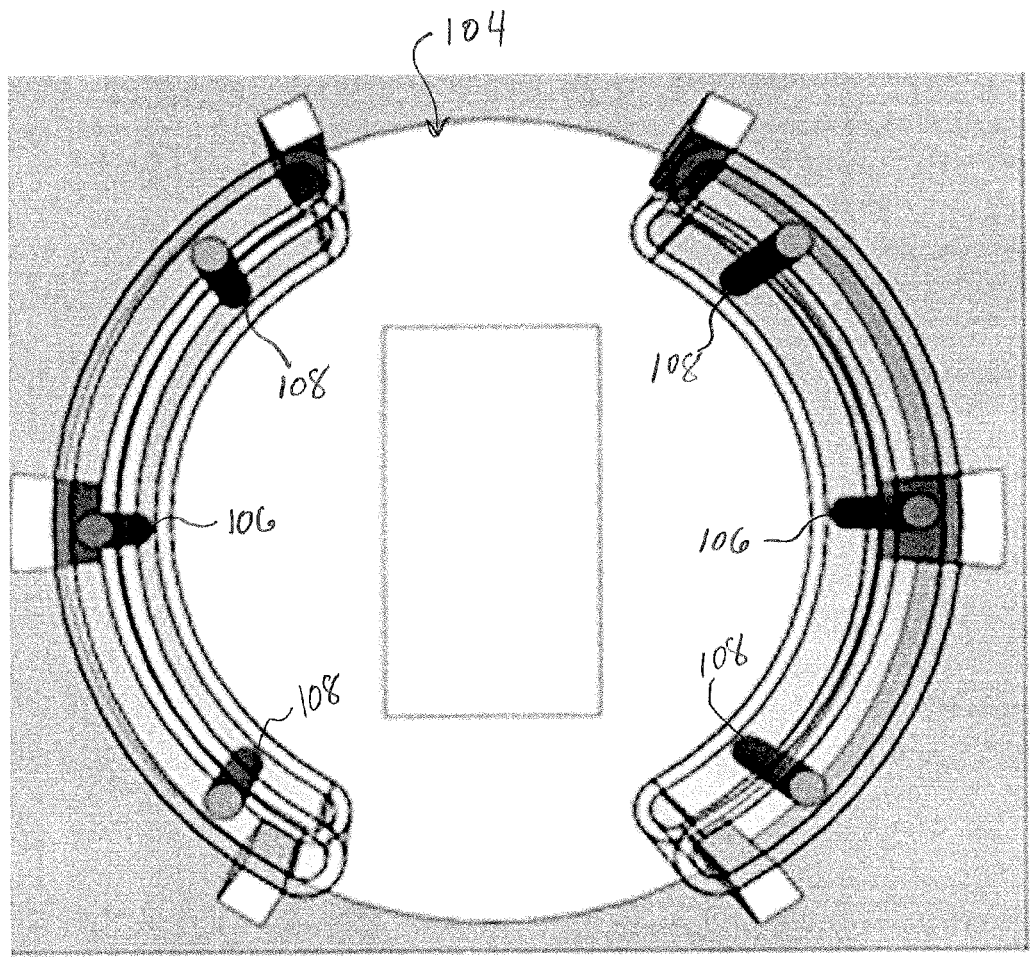
FIG. 1B illustrates a top view of a scanning device.

Referring now to FIGS. 1A and 1B, representations of some embodiments are illustrated. FIG. 1A illustrates a front view 102 and FIG. 1B illustrates a top view 104 of a scanning device 100. The vertical bars 106 are mono-static antennas similar to those used in previous systems such as the ProVision system available from L3 Corporation of New York, N.Y. The vertical bars 108 are novel bi-static antenna arrays that can be obtained from Sierra Nevada Corporation (SNC) of Sparks, Nev., or from other vendors. Both the mono- and bi-static arrays are fabricated to provide extra information for high resolution material characterization. In actual implementation, the separation between the bi-static array pairs would be changed electronically by switching between neighboring transmitter and receive antenna elements. This switching could be done horizontally in a pair of wide antenna pairs (2-D array) or by mechanically moving the pairs angularly along a common radius with center at common rotation center, or a more practical method would be implemented by switching vertically in each one-dimensional array of the pair of the bi-static arrays. Examples of this are illustrated later in the examples shown in FIGS. 13, 14, and 15 where certain horn elements are used in some situations as transmitters and in others as receivers as illustrated by the path lines in FIG. 15.

Figure 2:
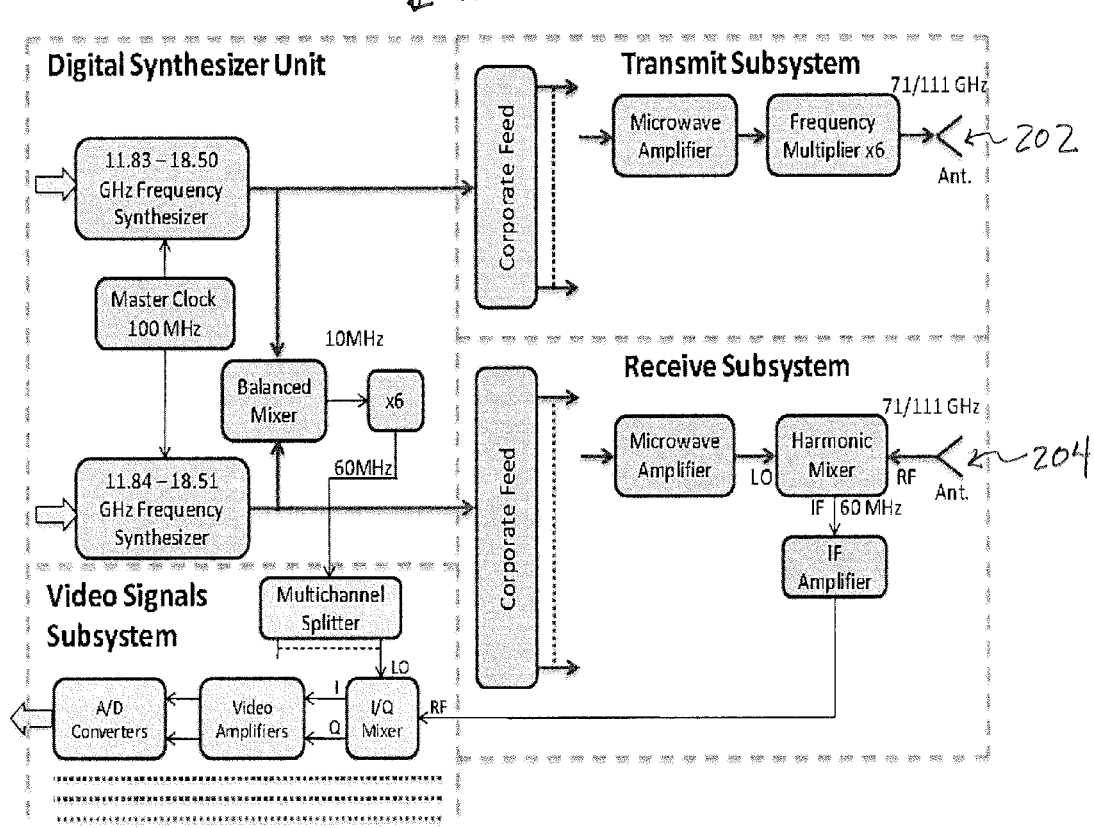
FIG. 2 illustrates a block diagram of scanner signal processing hardware.

Scattering data is coherently collected over full scanning and frequency ranges. A block diagram 200 of one embodiment system, using heterodyne detection and a digitizing unit is shown in FIG. 2, which can be used for a single height horizontal "slice". While only a single transmit antenna 202 and only a single receive antenna 204 are shown in FIG. 2; in practice many receive antenna elements (about 700) in two linear arrays are used to construct mono-static and bi-static arrays FIG. 2 illustrates a block diagram of scanner hardware. The scanner hardware implements a large bandwidth (B=about 35 GHz) and high center frequency ($f_c$=about 91 GHz) to obtain 5 millimeter lateral and 4 millimeter range resolution by heterodyne mixer circuits. The use of multiple, stepped adjacent combs of single frequencies to define the centers of narrow frequency bands allows an appropriate trade-off between a few wideband analog to digital converters (A/Ds) or many narrow bandwidth A/Ds, with the number of I/Q mixers set to provide adequate speed. The use of chirped, linear FM signals may be used to a greater advantage for improved signal to noise ratio and optimum data collection speed.

FIG. 3 illustrates an antenna geometry using two bi-static antennas 302-A and 302-B and a monostatic antenna 304 used to obtain monostatic and bi-static measurements of reflection from a voxel. A voxel is a volume element. A voxel can be analogized by comparison to a pixel except that a voxel has three dimensions as opposed to two for a pixel. In the example illustrated in FIG. 3, it is assumed that zero reflection occurs at the top (air interface) 306 and perfect reflection at occurs the bottom 308 of the single layer 310.

In evaluating FIG. 3, the following applies: c(x)=light speed (here millimeter wave speed) at x in a uniform thickness slab with no horizontal variation of material value; and $\sigma(x)$=absorption coefficient at the same x in the same slab. The following four equations are used:

1. Path 1: $I_1 = I_0 \exp[-2\sigma L \sec(\theta)]$

2. $t_1 = \left[\frac{2L}{c(x)}\right]\sec(\theta)$

3. Path 2: $I_1 = I_0 \exp[-2\sigma L]$
4. $t_2 = 2L/c(x)$, $n(x)=1/c(x)$

The material property $[\sigma(x)c(x)]$ derived by solving the four equations for $c(x)$ and $\sigma(x)$, in this case is given by $c(x)\sigma(x)=[\ln(I_1/I_2)]/(t_1/t_2)$. $\sigma(x)c(x)$ is calculated more accurately by $$\sigma(x)c(x) = \left[\ln\left(\frac{I_1}{I_2}\right) - \ln\left(\frac{R_1}{R_2}\right)\right] / (t_1 - t_2)$$

which adds reflectivity $R_1$ at the top 306 of the first layer 310 and $R_2$ at the bottom 308 of the first layer 310.

Including transmission ($T_1$,$T_2$) & reflection coefficients ($R_1$,$R_2$) for paths 1 & 2 gives $$\sigma(x)c(x) = \frac{\left[\ln\left(\frac{I_1}{I_2}\right) - 2\ln\left(\frac{T_1}{T_2}\right) - \ln\left(\frac{R_1}{R_2}\right)\right]}{t_1 - t_2}.$$

This can be used to produce images of the local EM phase of light (i.e. mm wave speed) $c_F(x)$ by analysis of the Vertical (V) and Horizontal (H) Fresnel reflection coefficients $r_V(\theta)$ & $r_H(\theta)$ as a function of incident & reflection angle in both V and H polarizations. Embodiments can then find $$\sigma(x) = \frac{|\sigma(x)c(x)|}{c_F(x)}$$

and produce simulated images of the heuristic, unit-less reflection coefficient given by $(r_H/r_V)$, $r_H/(r_H+r_V)$, $r_H/(/r_H+r_V)$, and $2(r_V-r_H)/(r_V+r_H)$ and their texture/statistical (moments) variants.

Figure 4:
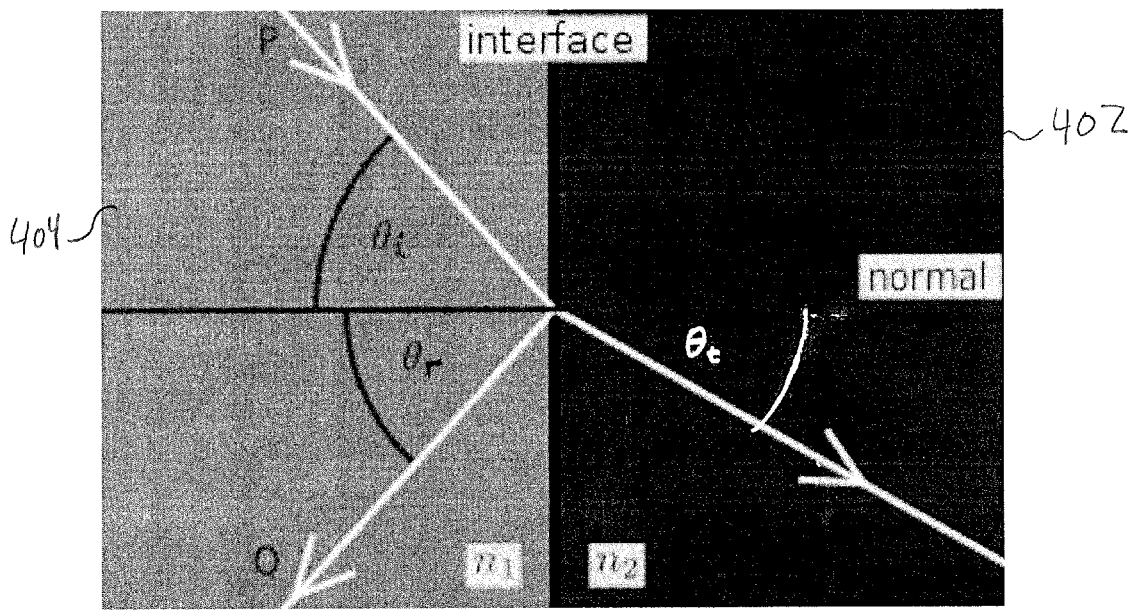
FIG. 4 illustrates a refraction plane defined by incident, reflected and refracted rays.
Figures 5A, 5B:
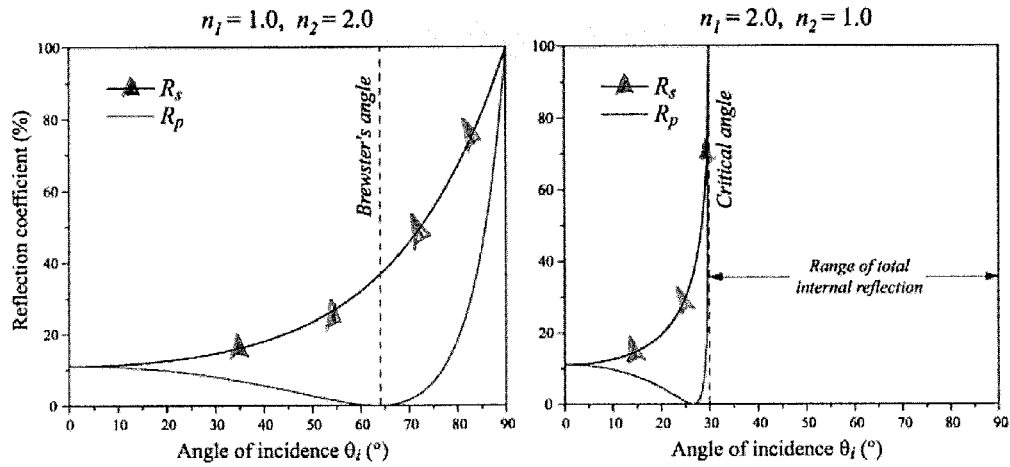
FIG. 5A illustrates a graphical representation of reflection coefficients.
FIG. 5B illustrates a graphical representation of reflection coefficients.

Material characterizing whole body mm-wave images can be improved by using algorithms dependent on Fresnel polarization dependent reflection and transmission coefficients (see FIGS. 4, 5A and 5B). Polarized light and other EM waves (e.g. mm-waves) obey Snell's law for transmission refraction angles and the laws of reflection (incident angle=reflected angle). However the laws of power (not amplitude) distribution among incident (I), reflected (R) and transmitted (T) rays is given by a third set of laws deduced by Fresnel, using conservation of energy, and are given by $R_s \equiv R_V = (n_1 \cos\theta_I - n_2 \cos\theta_T)^2 / (n_1 \cos\theta_I + n_2 \cos\theta_T)^2$.

For S-polarized (also called V, or vertical polarization, since the electric vector is perpendicular to the 2-D reflection-refraction plane) and by $$R_P \equiv R_H = (n_1 \cos\theta_T - n_2 \cos\theta_I)^2 / (n_1 \cos\theta_T + n_2 \cos\theta_I)^2$$

For P polarization (also called H, or horizontal, since the electric field vector is in the plane of reflection-refraction). Conservation of energy gives $T_V = 1 - R_V$ and $T_H = 1 - R_H$. From the FIGS. 4 and 5, it can be observed that the S=V and P=H polarizations behave very differently (they only take common values at 0° incident angles and at 90° for non-internally reflection case. For the internal reflection case the S and P polarizations are equal only at 0° incident and at the critical reflection angle. See FIGS. 4, 5A and 5B below, where $n_1$ is the right slab in FIG. 4. FIG. 4 illustrates a refraction plane defined by incident, reflected and refracted rays. FIG. 5A graphically illustrates reflection coefficients as compared to angle of incidence in an example where the index of refraction of the right slab 402 of FIG. 4 is $n_1 = 1.0$ and index of refraction of the left slab 404 of FIG. 4 is $n_2 = 2.0$. FIG. 5B graphically illustrates reflection coefficients as compared to angle of incidence in an example where the index of refraction of the right slab 402 of FIG. 4 is $n_1 = 2.0$ and the left slab 404 has an index of refraction that is $n_2 = 1.0$.

In FIG. 5A, the reflection coefficients are $R_S(=R_V)$ and $R_P(=R_H)$, for $n_2 > n_1$. In FIG. 5B, the reflection coefficients are $R_S(=R_V)$ and $R_P(=R_H)$, for $n_2 < n_1$.

From the Fresnel formulas and measurements of $\theta_I$, $\theta_T$, $R_S = R_V$, and $R_P = R_H$ it is possible to solve for $n_1$ and $n_2$. Once $n_1$ and $n_2$ are known it is possible to use the bi-static data to find the absorption coefficient from the product $c(x)\sigma(x)$. Then, $c_2(x) = n_2(x) c_0(x)$, and the absorption coefficient $\sigma_2(x) = [c(x)\sigma(x)]_2 / c_2(x)$. This formula is a simple starting point from which, to develop more sophisticated IST methods for quantitatively imaging the surface of a passenger, including skin and materials attached to skin or clothing.

Embodiments may include inverse scattering methods with higher resolution (i.e., range resolution of c/2B and vertical or horizontal (i.e. transverse) resolution of $\lambda/[2n \sin(\theta/2)]$ with higher quantitative accuracy, where c is speed of light, B is bandwidth, θ is aperature angle, λ is wavelength, and n is refractive index. These inverse scattering methods provide optimal spatial resolution and quantitative accuracy in determining bulk material properties.

A wave-equation-based, reflection mode, inverse scattering method for quantitative imaging of complex dielectric constant for security and other applications is illustrated herein. Unlike the previous ray-based methods (geometrical acoustics, which is analogous to geometrical optics) using a common mid-point gather approach (as it is commonly called in seismic data collection and imaging), the methods of this section are based on wave equations . These wave-based methods, which include all the advantages of ray-based methods, also include accurate modeling of reflection refraction, diffraction and multiple scattering. Present microwave and millimeter wave whole body imaging systems do not produce images that are quantitative representations of the bulk electrical properties of the passenger's body, his/her clothing, or any objects on the person, or in or under his clothing. In contrast, inverse scattering methods may have one or more of the following advantages over ordinary B-scan, reflection ultrasound: (1) a quantitative speed of sound image may be formed of high accuracy (of the order of one percent or less); (2) a quantitative attenuation image also may be formed; (3) these images are not warped or distorted by refraction and features in them are registered with their true positions in the imaged object; (4) these images are accurate in value and compensated for refraction and attenuation of the propagating ultrasound energy; (5) these images are compensated for multiple scattering events; (6) these images may be formed by nearly operator independent methods (like x-ray CT or MRI methods); (7) the mm wave, inverse scattering imaging methods can be used to produce full 3-D images with features that extend into space normal to the torso surface. This last feature (i.e. 3-D images) is particularly unique to inverse scattering methods. Other passenger imaging methods (e.g. back scatter x-rays, holographic micro wave and holographic mm wave methods) produce a 2-D image of the scattering object projected onto the curved 2-D surface of the torso. Some embodiments are able to produce a 3-D image because the inverse scattering algorithm back-projects information into the space outside of and normal to the torso (or other portions of a test subject).

The inverse scattering problem for passenger scanning has a similar 3-D Fourier transform spectra for nearly flat patches on the surface of the skin, with vertical spatial frequencies defined to be normal to the surface of the patch. Given this similarity, it is reasonable that slabs of contraband material (drugs, plastic explosives, etc.) could be imaged using mm wave inverse scattering methods. The wave equations for seismic wave propagation and mm wave equations, which are based on Maxwell's electromagnetic equations, are mathematically similar in form. Thus, embodiments may use a quantitative inverse scattering imaging algorithm that is analogous to the seismic inversion algorithm and to the transmission inverse scattering algorithm.

Embodiments may use a 3-D vector wave equation with both electric field and magnetic 3-D components. In this application and the geometry used, it would be reasonable to omit the magnetic field components. Also, it would be a reasonable approximation to only use the horizontal component of the electric field (the component with its electric field parallel to the patch surface). When this is done, it can be shown that the mm wave representative wave equation reduces to a scalar (not vector) wave equation (the Helmholtz wave equation). One further set of approximations can be used to create images: (1) use pre-focusing of rays as a basis set to expand the problem solution as a sum of basis functions; (2) extract the dielectric constant of the torso and of dielectric materials (on the torso surface) from the well-known reflection coefficient formula R=R(Co, Cs)=(Cs−Co)/(Cs+Co), where R is the reflection coefficient, Co is the phase speed of the mm waves in air, and Cs is the phase speed of the mm wave phase speed in the dielectric slab (both Co and C1 are measured within the band width of the mm waves used).

Theory and algorithms for inverse scattering imaging of mm waves: 1. Setting up the optimization objective functional as the modulus or L2 norm of the residual (residual=difference of measured scattered field and predicted field on the detectors).

2. Forward (direct) problem is predicting field on the detectors, given the knowledge of the scattering potential—i.e. the dielectric constant and conductivity of the heterogeneous body being imaged.

Parabolic (or paraxial) forward solution: an approximation to the full (elliptic pde) Helmholtz equation that utilizes a preferred direction of energy flow to yield a parabolic equation approximation. This enables a mixed real and k-space stepping method that—being recursive—is far faster than trying to invert the very large matrix associated with the elliptic partial differential equation.

3. Forming an approximate image by back-projection of the adjoint of the Jacobian operator (of the forward problem) so as to map the residual of scattered field on detectors in data space back into image space. The Jacobian being a linear operator represented as a recursion also, yields an adjoint that also is expressible as recursion. Thus all aspects of the inversion process are represented as recursions (and thus fast).

4. The full Inverse scattering solution is found by an optimization process based on nonlinear conjugate gradient iteration of: (1) forward problem yielding fields on detectors; (2) forming residual in data space; (3) back projecting into image space, to contribute to gradient direction (4) Calculation of Ribiere-Polak (or similar) descent direction and step length based on accepted formulae and (5) repeating until convergence to some predetermined criterion.

5. Attenuation inverse scatter imaging is included as an imaginary part of a complex dielectric constant (the real dielectric constant is the corresponding real part).

Some embodiments may suffer from a slow, inaccurate or inefficient solution to the forward scattering problem. A successful inversion of the mm wave, inverse scattering imaging problem requires an accurate direct scattering solution (also called forward problem solution) model that accurately predicts the data received at the receiver array. The forward problem must also be very fast in order for the inversion process to take a reasonable amount of time. For a simplified inverse scattering imaging algorithm for V polarization of the electric field of mm waves the starting point is the Helmholtz or 'reduced' (monochromatic) wave equation for the scalar field f(x) at point x.

$\nabla^2 f(x) + k^2(x)f(x) = 0$, where $$k(x) = 2\pi \frac{f}{c(x)} + i\alpha(x), k(x) = \omega/c(x) + i\alpha(x),$$

ω is the frequency of illuminating radiation, c(x) is spatially dependent electromagnetic phase speed of, and α(x) is the attenuation coefficient in Nprs/mm (1 Npr/mm=8.686 dB/mm). Embodiments distinguish the x direction and the other directions, which are transverse, i.e. y and z. The result can be written as:

$$\left(\frac{d^2}{dx^2} - k_y^2 - k_z^2\right)\hat{f}(x, k_y, k_z) + k_o^2 \hat{f} + \hat{k}^2(x, k_y, k_z) * \hat{f} - k_o^2 \hat{f} = 0,$$

where * denotes a convolution operation in the variables $k_y$, $k_z$, (i.e., the Fourier transform of the transverse variables y and z). The imaging algorithm itself is based on the Ribiere-Polak algorithm as described for example, in Wiskin, J., Borup, D., and Johnson, S. (2011a). "Inverse scattering: Theory," in Acoustical Imaging, edited by M. Andre (Springer, Dordrecht, Netherlands),Vol. 30, pp. 57-66, which is incorporated herein by reference in its entirety.

The caret ^, indicates Fourier Transform. F is the Fourier transform, and $\hat{f}(x_{j+1}) \equiv Ff(x_{j+1})$ is the Fourier transform of the field at j+1, $F^H = F^{-1}$ is the inverse Fourier transform (the Fourier transform is a Unitary operator and its inverse is the Hermitian (complex conjugate transpose operation H). The propagation direction (the x direction) is maintained in the space domain. The equation, can be written in the form $$\left(\frac{d^2}{dx^2} + (k_o\hat{R})^2\right)\hat{f} = -k_o^2 \hat{\eta}(x, k_y, k_z) * \hat{f},$$

where $$\hat{\eta}(x, k_y, k_z) = \frac{\hat{k}^2(x, k_y, k_z)}{k_o^2} - 1,$$

which is the imaged object function (OF), and $$\hat{R} \equiv \frac{1}{k_o}\sqrt{k_o^2 - k_y^2 - k_z^2}.$$

The total field can be written $\hat{f}(x, k_y, k_z) = \hat{f}^{inc} + \hat{f}^+ + \hat{f}^-$, where $\hat{f}^+(x)$ is (the Fourier Transform of) a right moving wave, and $\hat{f}^-(x)$ is a left moving wave, both along the x-direction. Using these right and left propagating waves in a 2-vector $$\begin{pmatrix} f^+ \\ f^- \end{pmatrix},$$

one can write the Helmholtz equation in a two component form system. It is important to note the distinction made between dimensions and components. The dimensions of the model represent the spatial dimensions (x,y, and z, for e.g) in which the physical waves propagate. The components represent the 'forward propagating—away from the source—and backpropagating—reflected waves propagating backwards toward the source—' waves. The forward propagating waves can be modeled in two (2) or three (3) dimensions. The backward propagating waves can be also modeled in two or three dimensions. That is, the number of components (i.e. whether forward and backpropagating waves are included) is independent of the number of spatial dimensions in which these waves propagate.

This system can be formally integrated over an infinitesimal distance from $x=x_j$ to $x=x_{j+1}=x_j+\epsilon$ to yield:

$$\begin{bmatrix} \hat{f}_{j+1}^+ \\ \hat{f}_{j+1}^- \end{bmatrix} \approx e^{\frac{ik_o\epsilon}{2\hat{R}}\hat{N}\begin{pmatrix} 1 & 1 \\ -1 & -1 \end{pmatrix}} e^{ik_o\epsilon\hat{R}\begin{pmatrix} 1 & 0 \\ 0 & -1 \end{pmatrix}} \begin{bmatrix} \hat{f}_j^+ \\ \hat{f}_j^- \end{bmatrix}.$$

Approximations involving the index of refraction in the transverse direction are utilized in this approximation.

Here, $\hat{f}(x, k_y, k_z) = \hat{f}^{inc} + \hat{f}^+ + \hat{f}^-$, where $\hat{f}^+(x)$ is (the Fourier Transform of) a right moving wave, and $\hat{f}^-(x)$ is a left moving wave, both along the x-direction.

Notation embodiments use: $\hat{N} \equiv \hat{\eta}(x, k_y, k_z)^* \equiv \hat{\eta}(x)^* \equiv \hat{\eta}(x, k_y, k_z)^* \equiv \hat{\eta}_x^*$, $\hat{R} \equiv \hat{R}(k_y, k_z)$. The 2 by 2 matrix formula (see below, i.e. the 2-component field is used:

$$\begin{pmatrix} f^+ \\ f^- \end{pmatrix}$$

—both forward and backward propagating waves are incorporated) is analogous to the 1 component formula (i.e. only forward propagating waves are accounted for), both of which embodiments explicitly represent below Embodiments symbolically represent the equation for the forward solution for the 1-component case (i.e. only forward propagating waves are incorporated) by $f_j = [t_j] A f_{j-i}$ where (using F for the Fourier transform), $A \equiv F^{-1}[p_{kl}]F$, $p \equiv e^{ik_0 \epsilon \hat{R}}$, with $p_{kl} \equiv e^{ik_0 \epsilon \hat{R}} = e^{i\epsilon \sqrt{k_0^2 - \mu_k^2 - \nu_l^2}}$ for the 1 component case (i.e. only forward propagating waves) and a similar result holds for the 2 by 2 matrix case (i.e. 2 components: both forward and backward propagating waves are included in $$\begin{pmatrix} f^+ \\ f^- \end{pmatrix}.$$

Also the square brackets [ ] indicate component-wise multiplication, not standard matrix multiplication: $[p_{kl}](\alpha_{ij}) \equiv (p_{kl}\alpha_{kl})$, i.e. the NxN operator $[p_{kl}]$, acting on the NxN matrix $(\alpha_{ij})$, yields the NxN matrix $(p_{kl}\alpha_{kl})$ (no sum on kl), that is each component of p, is multiplied by the corresponding component of $\alpha$.

For the 2-component case $$\begin{pmatrix} f^+ \\ f^- \end{pmatrix},$$

i.e. both forward and backward propagating waves: the 'free space propagator'

$$A \equiv F^{-1} \begin{pmatrix} [p_{kl}] & 0 \\ 0 & [\bar{p}_{kl}] \end{pmatrix} F$$

and the 'inhomogeneity phase mask' is $$(t_j)_{kl} \equiv \begin{pmatrix} [\alpha_{kl}] + I & [\alpha_{kl}] + I \\ I - [\alpha_{kl}] & I - [\alpha_{kl}] \end{pmatrix},$$

where $$\alpha_{kl} \equiv \frac{ik_0 \epsilon}{2} \left( \frac{\eta_{kl}}{R_{kl}} \right),$$

i.e. this is a two by two matrix of operators, and as usual, the square brackets indicate component-wise multiplication. Note that the 2×2 matrices act with ordinary matrix multiplication on the 2-component field vector $$\begin{pmatrix} f^+ \\ f^- \end{pmatrix}.$$

the operators within them that have square brackets act component-wise.

In all the above: $\mu_j \equiv (j-1)\Delta_{k_y}$, $\nu_l \equiv (l-1)\Delta_{k_z}$, are the coordinates in the transverse Fourier domains, as in $p_{kl}$ and $\epsilon$ is the propagation distance. (pixel size in spatial domain, and x direction, i.e. the propagation direction). As above, $[t_j]$ represents component-wise multiplication of the two dimensional array $t_j$, which being the phase mask, inserts phase or time delay information.

Embodiments define the 1-component case as solving only for $f^+$ and the 2-component case as solving for both $f^+$ and $f^-$, $$\left( \text{i.e. } \begin{pmatrix} f^+ \\ f^- \end{pmatrix} \right)$$

Now attention is directed to the 1-component case (except for specific comments) to portray the action of the Jacobian and the Hermitian adjoint of the Jacobian. The 2-component case is analogous, using the explicit representations shown above.

Symbolically:

$$(t_j)_{kl} \equiv e^{ik_0 \epsilon F^H \frac{1}{2\hat{R}} \hat{\eta}_j^*} \approx e^{\frac{ik_0 \epsilon}{2} \left( \frac{\eta}{\hat{R}} \right)}.$$

Note that the square brackets [ ] will always denote component-wise multiplication by the enclosed 2-D array. Now, $$(t_j)_{kl} \equiv e^{\frac{ik_0 \epsilon}{2} \left( F^H \frac{\hat{\eta}_j}{\hat{R}} \right)_{kl}},$$

so its perturbation is:

$$(\delta t_j)_{kl} = -\frac{ik_0 \epsilon}{2} D(\delta \eta_j)_{kl} e^{\frac{ik_0 \epsilon}{2} \left( F^H \frac{\hat{\eta}_j}{\hat{R}} \right)_{kl}},$$

where the operator D is:

$$D \equiv F^H \frac{1}{\hat{R}} F.$$

Note that t contains $\eta$, the object function (OF). Now recall that the

Jacobian is a linear map: J: $(\delta t) \to \delta f_N$, where $\delta t \equiv (\delta t_j)_{j=1, \ldots, N}$, $\delta t_j$ is the variation in $t_j$ for each propagation distance j. For an image space of size NxNxN, (for the 3 spatial dimension case where waves propagate in 3 spatial dimensions—the 2-spatial dimension case is treated similarly, but the image space is NxN. Here the spatial dimensions are independent of and different from the components representing forward and backward waves. The forward/backward waves propagate in 3 or 2 spatial dimensions in each case) each $(\delta t_j)$ is a matrix: $(\delta t_j)_{ik}$, representing the change in t, at distance, j, and having transverse coordinates i,k. Thus J: $(\delta t_j)_{ik} \to (\delta f_N)_{l,m}$, i, j, k, l, m=1, ..., N, i.e. J:$C^{NxNxN} \to C^{NxN}$, takes a perturbation in the object function (as embodied in t) and yields the (linear) change in the field as measured on the last slab of the image space at propagation distance j=N. This slab of the image space is the closest to the receivers. The propagation to the receivers is a linear operator that does not depend on the object function at all, and therefore can be included trivially. The change in the field as a result of a change in the object function (as opposed to the t) which is included here, is trivial to include by using the chain rule as shown directly above. An explicit representation for this Jacobian is $$J_l^{(jik)} \equiv \frac{\partial (f_N)_{l,m}}{\partial (t_j)_{ik}}.$$

However, embodiments may use a recursion formula for this Jacobian, which is derived as follows:

The Jacobian acting on an arbitrary variation $\delta t_j, j=1,\ldots N$: is given by direct perturbation of the recursion operation, i.e. $\delta f_j = [v_j]\delta t_j + W_j(\delta f_{j-1})$, where the W is a propagator from layer j to j+1, and $v_j$ is the total field at j−1 propagated through homogeneous space to j, i.e. $W_j \equiv ([t_j]A)$, and $[v_j] \equiv [Af_{j-1}]$, where the operator A is given above for both 1-component and 2-component cases. For the 2-component case $v_j$ is a two component vector, each component of which is an N dimensional vector associated with $f^+$, and $f^-$, i.e.

$$[v_j] \equiv \begin{bmatrix} v_j^+ \\ v_j^- \end{bmatrix} = A \begin{bmatrix} f_{j-1}^+ \\ f_{j-1}^- \end{bmatrix} \equiv F^{-1} \begin{pmatrix} [p_{kl}] & 0 \\ 0 & [\bar{p}_{kl}] \end{pmatrix} F \begin{bmatrix} f_{j-1}^+ \\ f_{j-1}^- \end{bmatrix},$$

W, similarly has two components using the 2-component definition of the operator t, defined above.

Note that: $\overline{A}^T f_{j-1} \equiv F^H [\overline{P}] F f_{j-1}$, that is, the Hermitian adjoint of A is a propagation step with the complex conjugate as the propagator, and $\overline{W}_N^T \equiv \overline{A}^T [\overline{t_j}] \equiv \overleftarrow{A}[\overline{t_j}]$, where the backward arrow above the A indicates that the propagation direction is to the "left", instead of the positive direction (to the right). Embodiments use these observations to define the Adjoint operator.

The adjoint or back propagation problem. The Adjoint of the Jacobian is also a linear map, now in the opposite direction:

$$J^H: \delta f_N \to \delta t \equiv (\delta t_j)_{j=1,\ldots,N}$$

The adjoint is given explicitly by the following recursions: First, define 'adjoint' field as follows: $f_N^{adj} \equiv \bar{f}_N^{(n)} - \bar{f}_N^{(meas)}$, the difference between the predicted field at the last propagation distance, N, and the nth iteration of the Ribiere-Polak algorithm: $\bar{f}_N^{(n)}$ and the measured data $\bar{f}_N^{(meas)}$. Subsequently define $$f_{j-1}^{adj} \equiv \overleftarrow{A}[\bar{t}_j] f_j^{adj}, \text{ for } j = N, N-1, \ldots, 2, 1.$$

This 'adjoint field' is then used to define the result of the action of the adjoint of the Jacobian on the residual: $\delta f_N \equiv \bar{f}_N^{(n)} - \bar{f}_N^{(meas)}$ as follows: $\overline{\delta t_j} \equiv [v_j] f_j^{adj}, j=N, N-1, \ldots, 2, 1$, and finally $\delta t_0 = f_0^{adj}$ Finally the update in $$\eta(x) \equiv \frac{k^2(x)}{k_o^2} - 1$$

is:

$$(\delta \eta_j)_{kl} = \frac{2i}{k_o \varepsilon} F^H \hat{R} F \left[ e^{\frac{ik_o \varepsilon}{2}\left(F^H \frac{\hat{\eta}_j}{\hat{R}}\right)_{kl}} (\delta t_j)_{kl} \right].$$

Note that there is an explicit update for the $f_o$. Embodiments solve for η using Ribiere Polak minimization, utilizing the corresponding t, at each pixel, as an intermediate variable in the forward, Jacobian and adjoint subroutines. The Jacobian action is used in the step-length calculation, the Adjoint of the Jacobian issued in the gradient calculation. The operator which propagates the field at the edge of the image grid to the receivers is given by $$T_{\omega \theta k}^l(f) \equiv \langle f_{\omega \theta}^l | f_k \rangle_{L_2[R^2]} \in C.$$

$f_k$ is the field generated by the $k^{th}$ receiver acting as a source, ω is frequency θ is angle of incident field l is level, k is receiver number, and $\langle | \rangle_{L_2}^{[R^2]}$ is the inner product. Thus the adjoint is merely the field generated by each receiver element evaluated at the grid slab closest to the receiver array, WEIGHTED by the data residual at that particular receiver element and for that level, l, direction θ, and frequency ω. This is the operator that may be updated to account for the possibility of a curved transmitter and/or receiver array geometry.

The success of the present algorithms gives an a fortiori justification for the successive approximations given explicitly above.

The following now illustrates additional hardware, system and design descriptions of some embodiments.

In the following, a specific system design process is illustrated.

TABLE B

Table of Symbols and Definitions ΔR

| | |
|---|---|
| $\lambda_{oC} =$ | cent freq. air wave length at 92.5 GHz = c/f = 2.9979 × 10^11 [mm/sec]/92.5 × 10^9 [1/sec] = 3.24 [mm] |
| $R_1 =$ | average radius of a circle about center of rotation that is tangent to sternum and mid back |
| $R_2 =$ | average radius of a circle about center of rotation that is tangent to both shoulders |
| $\Delta R =$ | increment of radius (including clothing) added to R2 to give the actual radius of rotation of the antenna |
| $R =$ | $R_2 + \Delta R =$ the actual radius of rotation of the antenna |
| $R_\theta =$ | Radius from center of rotation in the body to the skin surface at angle θ |
| $N_{Lelem} =$ | Number of antenna elements in one (vertical) antenna of length L |
| $L =$ | vertical height of each linear array |
| $B_f =$ | Frequency bandwidth = 75 GHz to 110 GHz = 40 GHz. Center frequency = 89.5 GHz |
| $H =$ | L + (mechanical rotation equipment Height) |
| $C_{scan} =$ | circumference of antenna scan = 2π(R) |
| $N_{circum} =$ | number of elements in circumference = $C_{scan}$ ( ) = |
| $\Delta r =$ | Stand-off distance = difference in radii of propagation = (40 − 28)/2 [in] = 12/2 in |
| $T_0 =$ | time of frequency I and Q quadrature sample-and-hold digitization = Δt = (2Δr)/c |
| $\delta f =$ | Frequency sample interval in temporal frequency domain = 1/T_0 |
| $N_f =$ | Number of frequency samples in band of 40 GHz = 40/0.98 |
| $T_1 =$ | Additional time delay to complete sample-and-hold operation = 10 ns. |

TABLE B-continued

Table of Symbols and Definitions ΔR

| | |
|---|---|
| $T_{1\text{-}freq} =$ | Time to collect data for one frequency at one surface point for mono-static data = $(T_0 + T_1)$ |
| $M =$ | the degree of independent multi-static data collected for one frequency at one surface point |
| $T^M_{freq} =$ | Time to collect data for all frequencies at one surface point for mono-static data = $M \times N_f \times (T_0 + T_1)$ |
| $\Delta L =$ | antenna element width [mm] = $L/N_{eL}$, $N_e = L/\Delta L$. |
| $N_{el} =$ | Number of antenna elements on cylinder of rotation [each one sq. wavelength] = $(N_{circum})(N_{Lelem})$ |
| $T_{scan} =$ | Time to scan passenger = $N_{el} \times N_f \times (T_0 + T_1)$ |

The first step is to define the radius of the data collection surface=R, measured from the center of antenna rotation. Choose average R=28/2=14 inches. A sliding and locking adaptor can be incorporated to vary the radius from R1=6 inches to R2=16 inches (to compensate for different body builds, obesity, and clothing.)

The height H of the two vertical arrays: L1=L2=6 ft. So L=6 ft

Choose frequency band and center frequency. Embodiments may use the W-band as the optimal compromise between spatial resolution and lower cost. The center frequency is 89.5 GHz and the band width is 35 GHz.

Choose antenna element width. Embodiments may use separate transmit and receive antennas, both for Transmit and Receive (parallel and adjacent for mono-static mode; but parallel and adjacent for bi-static mode). Embodiments may use a FWHM (full width at half maximum) angular beam pattern of 45 degrees as a starting point for iterative search of possibilities (using beam pattern simulation software). This beam pattern may result from an antenna width of about one wavelength at the center of the band frequency.

Choose the minimum size object to be resolved. Choose the smaller of range or lateral resolution. For the selected frequency, the smaller is 4.28 mm for range resolution.

Choose number of Gaussian AM modulated envelop monochromatic pulses to cover synthesizing a maximally short pulse in time with the required bandwidth.

Choose a Gaussian envelop in time given by $h(t) = \exp(-t^2/a^2)$

The full width at half max (FWHM) (time value) of this AM envelope is $t_{(FWHM)} = 2a(\ln[2])^{1/2}$ The corresponding width in space is $r_{(FWHM)} = (c/2)t_{(FWHM)} = c\, a(\ln[2])^{1/2}$ $r_{(FWHM)} = c\, a(\ln[2])^{1/2}$ The corresponding frequency spectra is given by the Fourier transform of $h(t) = \exp(-t^2/a^2)$ and is $H(f) = a\pi^{1/2} \exp(-\pi^2 a^2 f^2)$ This is also a Gaussian with a full width at half max (FWHM) (frequency value) of $f_{(FWHM)} = 2(\ln[2])^{1/2}/(a\pi)$ Choose shape and length of each AM modulated monochromatic pulse (AM MC P)

Set $\delta r = c/(2B)$, (where B is bandwidth of the W band=35 GHz). So $\delta r = c/(2B) = 3 \times 10^{11}$ [mm/sec]/$(2 \times 35 \times 10^{-9}$ [cycles/sec]=4.283 mm. But $\Delta t = 2\Delta r/c$, so Set $\delta r = \Delta r$ gives $\Delta t = 2\Delta r/c = (2/c) \times (c/(2B)) = 1/B$ Then $\Delta t = 1/B = 1/(35\text{ GHz}) = 0.02857$ ns is the corresponding FWHM Gaussian time pulse width. Then $\Delta t = 1/B = 0.02857$ ns = $2a (\ln[2])^{1/2}$ from Eq (2a), so 0.02857 ns = $2a (\ln[2])^{1/2}$, but on solving for parameter a, results in $a = (\tfrac{1}{2} \times 0.02857)[\text{ns}]/1/(\ln[2])^{1/2} = 0.0172$ ns then $f_{(FWHM)} = 2(\ln(2))^{1/2}/(\pi a) = 30.82$ GHz.

This 30.82 GHz Gaussian window is apodized and therefore less wide than a 35 GHz rectangular window.

Calculate and create either static or moving window specifications for transmit. It is possible to design the transmit time window and receive time window at least two ways (two cases):

In a first case, by use of a static (fixed) time window length, whose length in space ranges from the nearest part of the test subject body to the scanner antenna to the corresponding furthest part of the test subject and his clothing.

In a second case, by using a moving time window, whose length in space brackets the body and clothing of the test subject, for all antenna and test subject positions (assuming the test subject is near the center of rotation of the antenna).

In either case, the mathematics is similar and depends on transmitting and receiving separate narrow bandwidth AM-window, modulated signals. In the first case the delays are fixed. In the second case the delays track the shortest distance from the antenna to the body. The selection of the delays before the body is scanned accomplished by efficient predictor corrector methods. The total round trip echo delay in spaced $\Delta r$ depends on the forward delay in time $\Delta t$ by $\Delta r = (c/2)\Delta t$. The forward half-echo distance is equal to the forward delay (c$\Delta t$). The forward distance delay plus backward echo distance delay are equal and add. Thus, the total round trip echo delay in spaced $\Delta r$ depends on the forward delay in time $\Delta t$ by $\Delta r = (c/2)\Delta t$.

Case a. Let the minimum radius the skin surface be $R_1 = 6$ inches (approximately half the distance from mid-back to mid-chest). Let $R_2 = 10$ inches (approximately half distance from the left shoulder through the back to right shoulder). Then the difference is 4 inches. Add 2 inches for clothing and obesity to give a difference of $\Delta r = 6$ inches in radius. Thus, in mm $R = \Delta r = 6(25.4) = 152.4$ [mm] This is the actual radius of scan R $R = 152.4$ [mm].

Thus, 2 $\Delta r = 12$ inches. So round trip (echo) travel time is $\Delta t = (2/c)\Delta r$.

Thus $\Delta t = (2/c)\Delta = (2/2.998 \times 10^{11}$ mm/sec)(152.4 mm)=1.02 ns. (Recall the rule of thumb that light travels 1 foot in 1 nanosec.)

$\Delta t = 1.02$ ns

Next recall that the frequency separation of a discrete set of frequencies that is the spectral expansion of a finite time interval of $T_o = \Delta t$ has a frequency sample interval $\delta f$ given by $\delta f = 1/T_{oa} = 1/\Delta t = 1/(1.02 \text{ ns}) = 0.980$ GHz.

A time interval $T_o$ must have a smallest non-zero frequency at the spacing length $\delta f$ of the spectrum.

Case b. In the case of a moving sampling window in time that brackets the echo from the skin and clothing. Suppose the bracketing time interval is $\Delta t = 1.02$ ns times 3 for overlap to allow for apodizing. Then, set $\Delta r$ equal to five times the range resolution or $5(B/(2c) = (5)(4.28$ mm$) = 21.4$ mm This is much smaller than the range limit for Case a, above, which is 152.3 mm Thus, set $\Delta r = 5(B/(2c)$ and then find $\Delta t = (2/c)\Delta r = (2/c)(5(c/(2B)) = 5/B = 5/35 = 0.143$ ns Set $T_{ob} = \Delta t$. then $\delta f = 1/T_{ob} = B/5 = 35/5 = 7$ GHz.

Now compute the number $N_f$=Number of frequency samples in band of 7 GHz=40/0.98

$N_f=B/\delta f=35/7=5$ sub-bands

Now add $T_1$=additional time delay to complete sample-and hold operation=10 ns.

Time to collect data for one frequency at one surface point for mono- static data=$T_{1\text{-}freq}$ Case a. $T_{1\text{-}freq}=(T_o+T_1)=1.02$ ns+10 ns=11.02 ns
Case b. $T_{1\text{-}freq}=(T_o+T_1)=0.143$ ns+10 ns=10.14 ns Choose M=the degree of independent multi-static data collected for one frequency at one surface point. This is more expensive, but would give better accuracy. Several choices are evident. M=2 is the simplest form and is known as w <6 bi-static, which is suggested and shown in FIGS. 1 and 6. It is comprised of one transmitter and one receiver. Choosing M=4 is a geometry with a pair of bi-static arrays 2 transmitter arrays +2 receivers arrays.

(Case a: M=2): Time to collect $N_f$ frequencies/2-D pixel=$T_{2N\text{-}f}=(T_{1\text{-}freq})(N_f)(M=2)=(11.02)(5)(2)=110.2$ (Case b: M=4): Time to collect $N_f$ frequencies/2-D pixel=$T_{4N\text{-}f}=(T_{1\text{-}freq})(N_f)(M=4)=(11.02)(5)(4)=220.4$ ns The number of virtual elements on the scanning circumference are found by $(N_{circum})=C_{scan}/\lambda_{oC}$ Now set R=. Then, $(N_{circum})=C_{scan}/\lambda_{oC}=(2\pi R)(1/\lambda_{oC})=(2\pi R \text{ mm})/(3.24 \text{ mm})=(2\pi \times 152.4)/(3.42)$
$6.28 \times 152/(3.42)=279$ virtual elements This is 279 steps over 360 degrees of complete rotation.

Now find the number of elements on the each vertical array by $(N_{Lelem})=L/\lambda_{oC}$ $(N_{Lelem})=L/\lambda_{oC}=(6 \text{ ft}=12 \text{ in per ft} \times 25.4 \text{ mm per inch})/(3.42)=535$ elements.

The total number of virtual elements on scanner 2-D cylindrical surface is=$N_{el}=(N_{circum})(N_{Lelem})=(279)(535)=149,265$ elements.

Time to scan test subject=$T_{scan}=(N_{el})(T_{MN\text{-}f})(N_{el}=149,265)$ (Case a: M=2): Time to collect all 2-D cylindrical data= $(149,265)(T_{2N\text{-}f})=(149,265)(110.2)=16$ ms
(Case b: M=4): Time to collect all 2-D cylindrical data= $(149,265)(T_{4N\text{-}f})=(149,265)(220.4 \text{ ns})=32$ ms These times do not include the speed of the scanning antennas, which is measured in seconds. Thus the time of scan is limited by antenna motion velocity.

These times are calculated using only a single analog to digital converter (ADC) that is at base band of 0 to 35 GHz. This would require an expensive ADC. Thus, it would be wise to use multiple ADCs but with narrower basebands.

A more common and much simpler approach is to us quadrature detectors (I and Q channels), followed by a low pass filter and a sample and hold circuit, and then followed by a low cost ADC with a band width less than 100 MHz or less. As above, there can be a multiple of such chains of quadrature detectors, low pass filters, sample and hold circuits, and ADCs.

There are two main types of multi-static antenna configurations: (1) horizontal; and (2) vertical. For horizontal configurations the muli-static antennas are located on a circle of common height and they move as a whole around this circle, whose center is the center of rotation. An example of this is shown in both FIG. 1 and FIG. 6. FIG. 3 shows a general bi-static configuration that when rotated to lie in a horizontal plane fits FIGS. 1A, 1B and 6.

Figure 7:
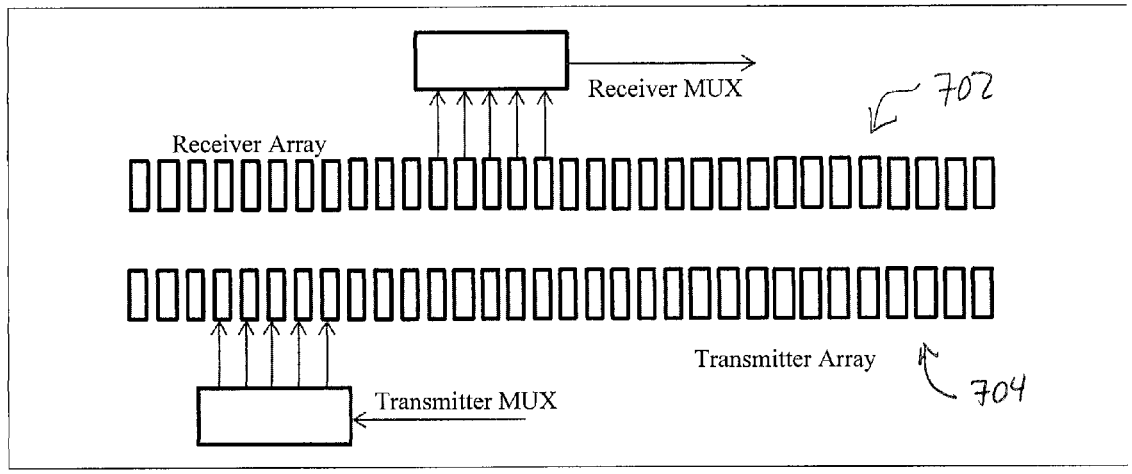
FIG. 7 illustrates a block diagram of circuits for switching (multiplexing) both transmitter and receiving antenna elements.

For vertical configurations, FIG. 3 shows a general bi-static configuration that when rotated to lie in a vertical plane, with the wave field directed inward toward the center of rotation, fits FIG. 7, which also represents a vertical array of elements that when connected through switches (multiplexers) to a transmitter microwave power source can synthesize a vertical multi-element, multi-static transmitter array. Likewise, FIG. 3 when connected through switches (multiplexers) to a microwave receiving chain (down-converter mixer, quadrature detector pair (I and Q channels, two low pass filters, two sample and hold circuit, and a pair of ADCs) can synthesize a vertical multi-element, multi-static receiver array.

Figure 8:
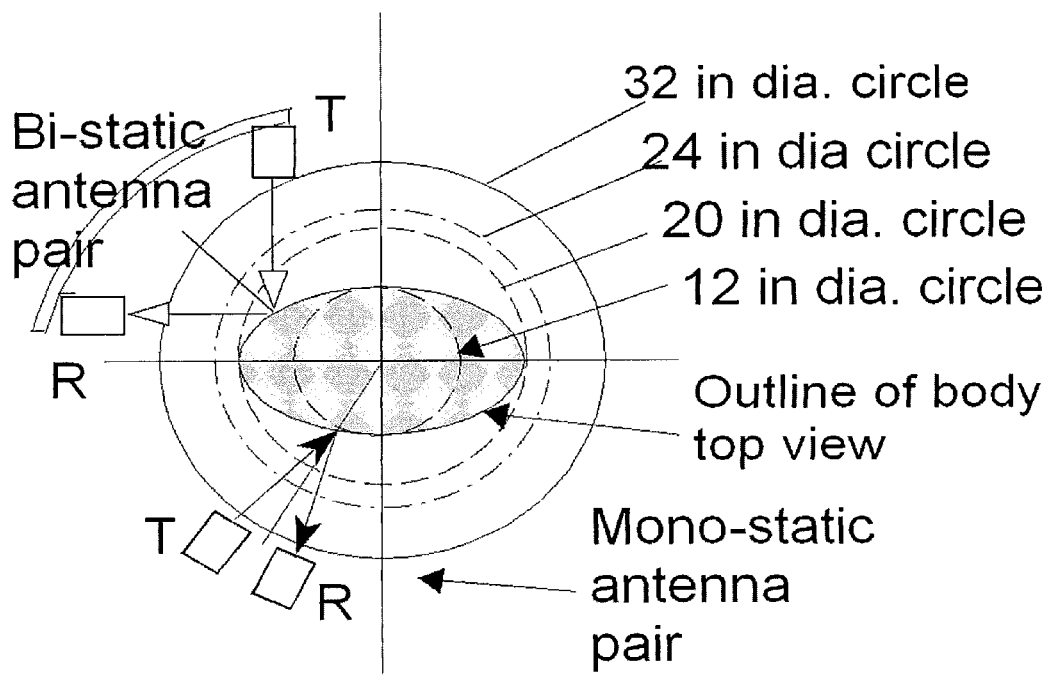
FIG. 8 illustrates a top view of a geometry used for calculation of quantitative material images.
Figure 9:
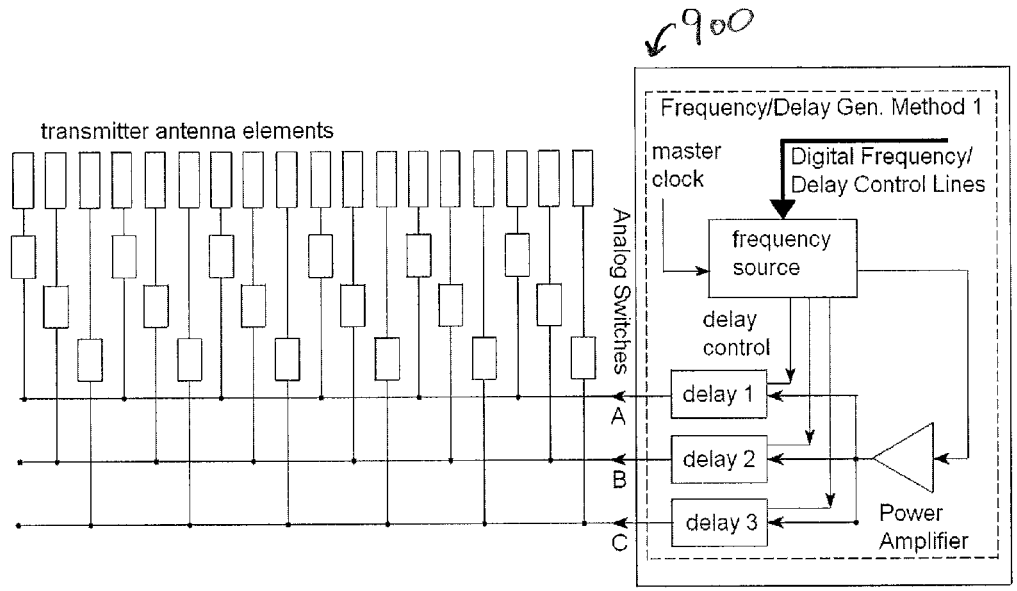
FIG. 9 illustrates a block diagram of a circuit for switching (multiplexing) both transmitter and receiving antenna elements.
Figure 10:
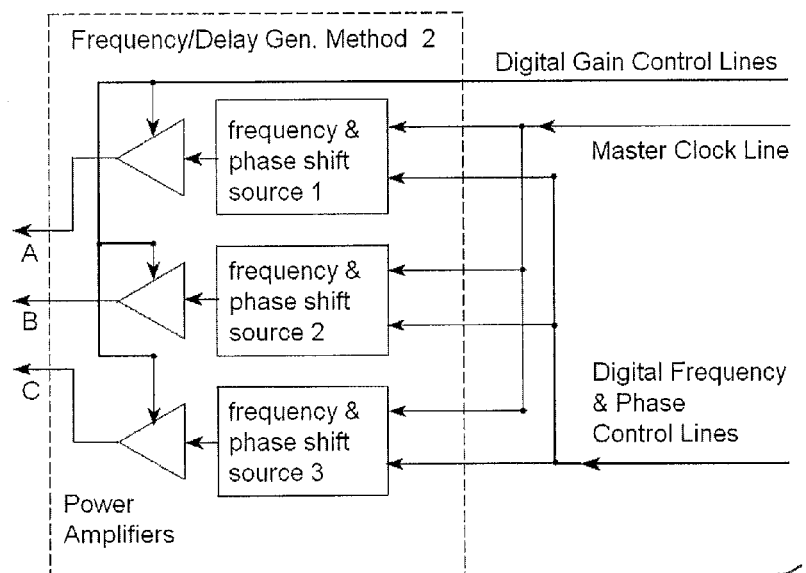
FIG. 10 illustrates a block diagram of circuit for switching (multiplexing) both transmitter and receiving antenna elements

Transmitter switching and receiver switching and special circuits are illustrated in FIGS. 8, 9 and 10. The explanation of function and operation is given below.

Additional details are now illustrated for groups of transmitter elements and groups of receiver elements for either vertical or horizontal configurations. These are shown below in FIGS. 7, 11 and 12. The explanation of function and operation is given below.

FIG. 7 illustrates a block diagram of circuit for switching (multiplexing) both transmitter and receiving antenna elements. Shown is a vertical segment 702 of a single transmitting (Tx) array and its matching complementary partner, a vertical segment 704 of a single receiving (Rx) array. It is possible to use this same geometry for a pair (Tx, Rx) of array arranged as parallel circular loops contained respectively in two parallel horizontal planes.

Figure 6:
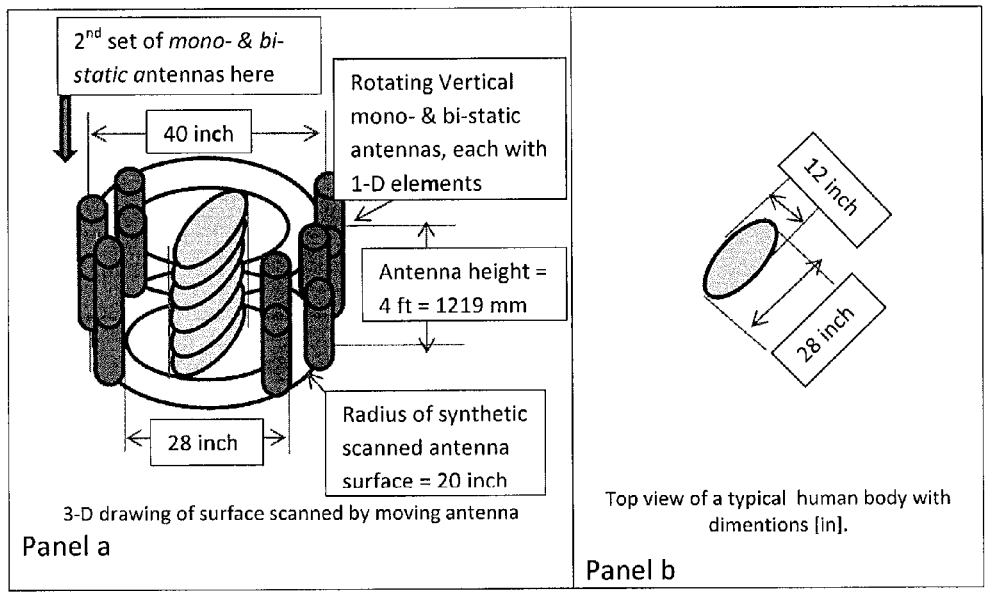
FIG. 6 illustrates a scanner and a test subjects relationship to the scanner.

The architecture of the scanner and the geometry of the corresponding vertical array are shown in FIGS. 1 and 6.

FIG. 8 illustrates a top view of geometry used in TABLE B for calculation of quantitative material images. The mathematical and geometrical parameters of TABLE B are used to calibrate the multi-static reflection data collected from the reflection antenna arrays. These data are then processed by inverse scatter imaging algorithms to reconstruct the quantitative material image voxel values in 3-D. This calculation can be made at two levels of precision. At the first lever the Born approximation is used to reconstruct useful images, since the penetration depth is the skin is small. For more accurate and detailed imaging, the use the full nonlinear model of inverse scattering will supply improved spatial resolution and quantitative voxel values. It is possible to use this same geometry for a pair (Tx, Rx) of array arranged as parallel circular loops contained respectively in two parallel horizontal planes.

FIG. 9 illustrates a general Block diagram of circuit 900, which can be employed for switching (multiplexing) both transmitter and receiving antenna elements. Shown is a vertical segment of a single transmitting (Tx) array and suggests a similar matching complementary switching network partner, a vertical segment for a single receiver (Rx) array. It is possible to use this same geometry for a pair (Tx, Rx) of array arranged as parallel horizontal circular hoops contained within respectively two parallel horizontal planes. For receiver mm-wave antenna element switching, the Frequency/Delay General method, method 1, or method2, Blocks in FIGS. 9 and 10 respectively would be replaced by the appropriate sub-blocks in FIG. 2.

Figure 11:
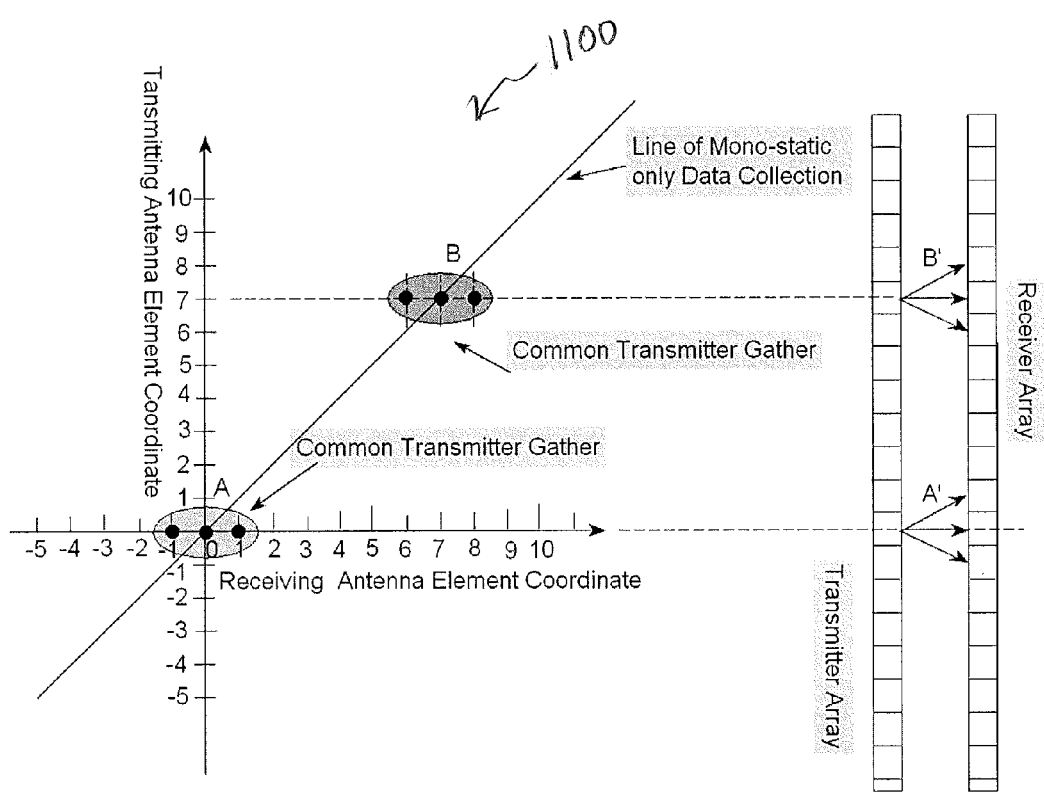
FIG. 11 illustrates a two-dimensional plot of transmitter-receiver groups.

FIG. 11 illustrates a two-dimensional plot 1100 of transmitter-receiver groups. This plot is useful for analyzing the operation of the analog switching network (connecting i.e. multiplexing) of antenna array transmit elements to power amplifiers and antenna array receiver elements to amplifiers to ADCs or quadrature detectors. Each type of data collection procedure is mapped onto a line or 2-D region. Here the procedure of mono-static data collection is a 1-D map onto to the 45 degree line: (transmitter element)=(receiver element).

A so-called "common transmitter gather" is shown for the respective cases of common transmitter element 0 and for element 7

Figure 12:
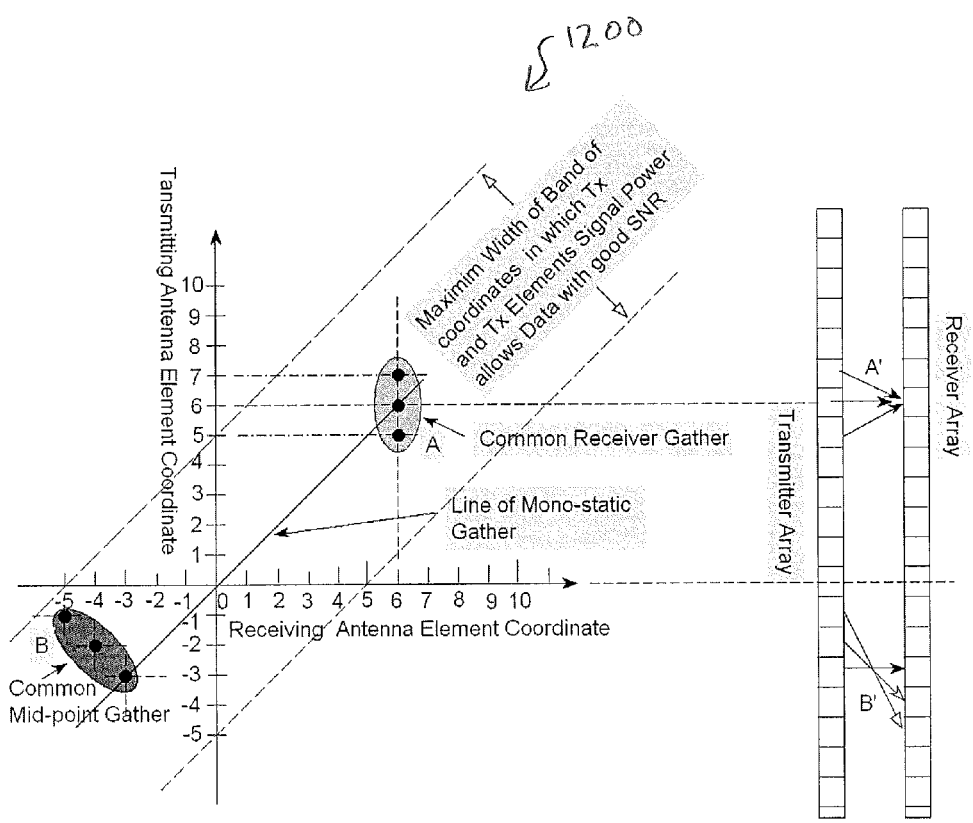
FIG. 12 illustrates a two-dimensional plot of transmitter-receiver groups

FIG. 12 illustrates a two-dimensional plot of transmitter-receiver groups. This plot is useful for analyzing the operation of the analog switching network (connecting i.e. multiplexing) of antenna array transmit elements to power amplifiers and antenna array receiver elements amplifiers to ADCs or quadrature detectors. Each type of data collection procedure is mapped onto a line or 2-D region. Here the procedure of mono-static data collection is extended to the more general: Common Mid-point Gather", of which the "Mono-static Gather"(Common Transmitter and Receiver) is a special case. Here, the common mid point is transmitter element minus 3 and receiver element minus 3. The Common Mid-point Gather maps the data onto to a minus 45 degree line: (transmitter element)=–(receiver element) +(a constant). A so-called "Common Receiver Gather" is also shown also for the case of common receiver for receiver element 6.

Some embodiments may be unique in their inclusion of greater spatial resolution than is found in the present, most used or common, microwave or millimeter scanners. In addition, some embodiment scanners may have the capability to produce 3-D, material-characterizing images (through clothing) of the human body and objects/material placed in contact or close to the body, that are quantitative in complex dielectric properties. These superior images therefore provide a further means for improving material characterization and contraband detection by use of additional imaging processing algorithms that are sensitive and selective to 2-D and 3-D texture analysis and discrimination opportunity. Thus, the new scanner improves sensitivity and specificity to reduce false positives (target)and false negative (target) alerts/alarms.

Except for the parts used for connection to the antenna elements, the antennas as a whole may typically be identical to one another. A monostatic antenna may be very closely modeled by a close pair of antenna, the first of which is an array of receiver elements and the second of which is an array of transmitting elements. Such an arrangement reduces direct coupling between the transmitter and receiver antenna. A bi-static antenna may comprise two antenna arrays separated by a distance (e.g., typically larger than the separation of nearest neighboring antenna elements in an array).

Figure 13:
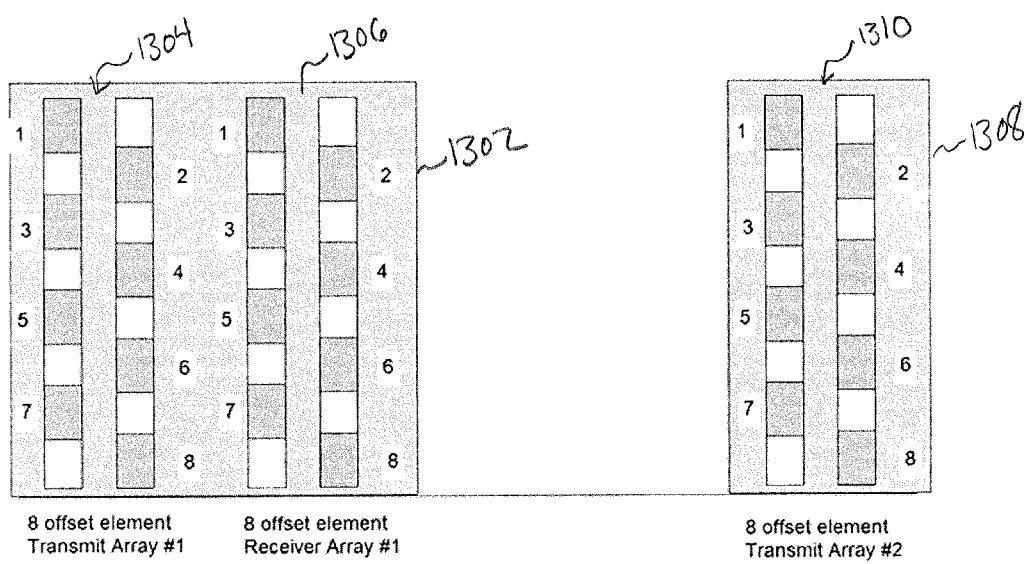
FIG. 13 illustrates an antenna configuration.
Figure 14:
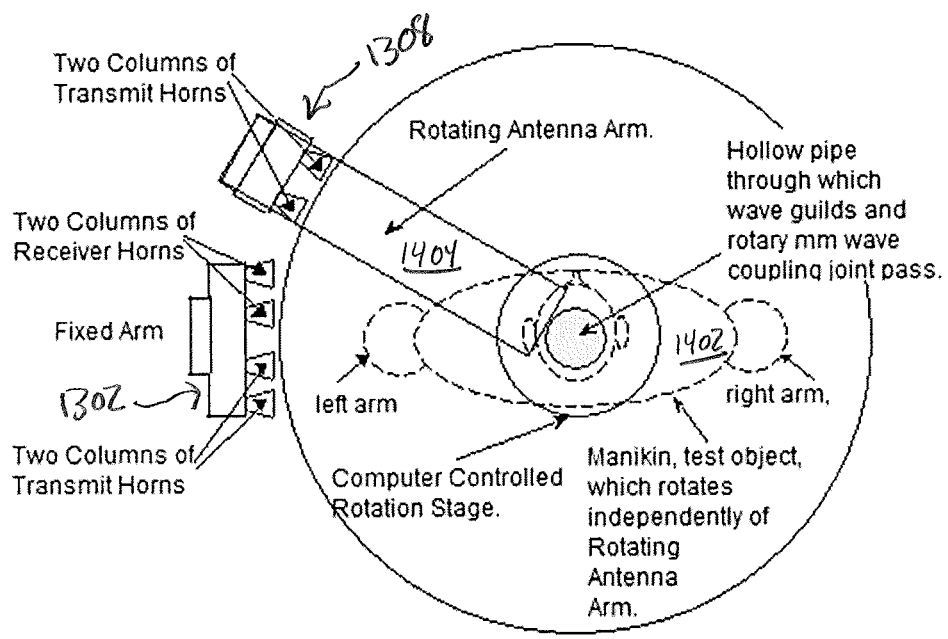
FIG. 14 illustrates an antenna configuration with respect to a test subject.
Figure 15:
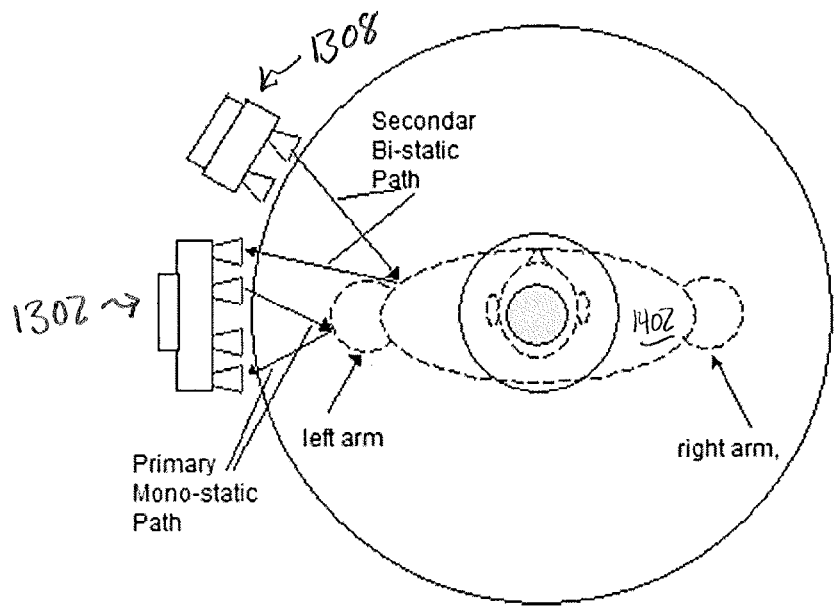
FIG. 15 illustrates an antenna configuration with respect to a test subject.

Referring now to FIGS. 13, 14 and 15, where details for some embodiments are illustrated. FIG. 13 illustrates an antenna configuration including a fixed portion 1302 which includes an 8 offset element transmit array 1304 and an 8 element offset receiver array 1306. FIG. 13 further illustrates a movable portion 1308 which includes an 8 offset element transmit array 1310.

FIG. 14 illustrates a top view of an apparatus including the elements shown in FIG. 13. FIG. 14 illustrates a test subject 1402 which can rotate independently of the movable portion 1308. In the illustrated example, the movable portion is controlled by a rotating antenna arm 1404. FIG. 15 illustrates that both mono-static and bi-static paths are generated by two independent rotations, respectively of the moving antenna on the movable portions 1308 and the test subject 1402.

Algorithms, and other information relative to imaging systems is disclosed in earlier U.S. Patent Numbers and Published Applications listed below, each of which is herein incorporated by reference in its entirety. In addition, all other publications cited within the present provisional application, whether supra or infra, are hereby incorporated by reference in their entirety to the same extent as if each individual publication was specifically and individually indicated to be incorporated by reference.

U.S. Pat. No. 5,588,032
U.S. Pat. No. 6,005,916
U.S. Pat. No. 6,587,540
U.S. Pat. No. 6,636,584
U.S. Pat. No. 7,570,742
U.S. Pat. No. 7,699,783
U.S. Pat. No. 7,771,360
U.S. Pat. No. 7,841,982
U.S. Publication No. 20060009693
U.S. Publication No. 20060287596
U.S. Publication No. 20060293597

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 16:
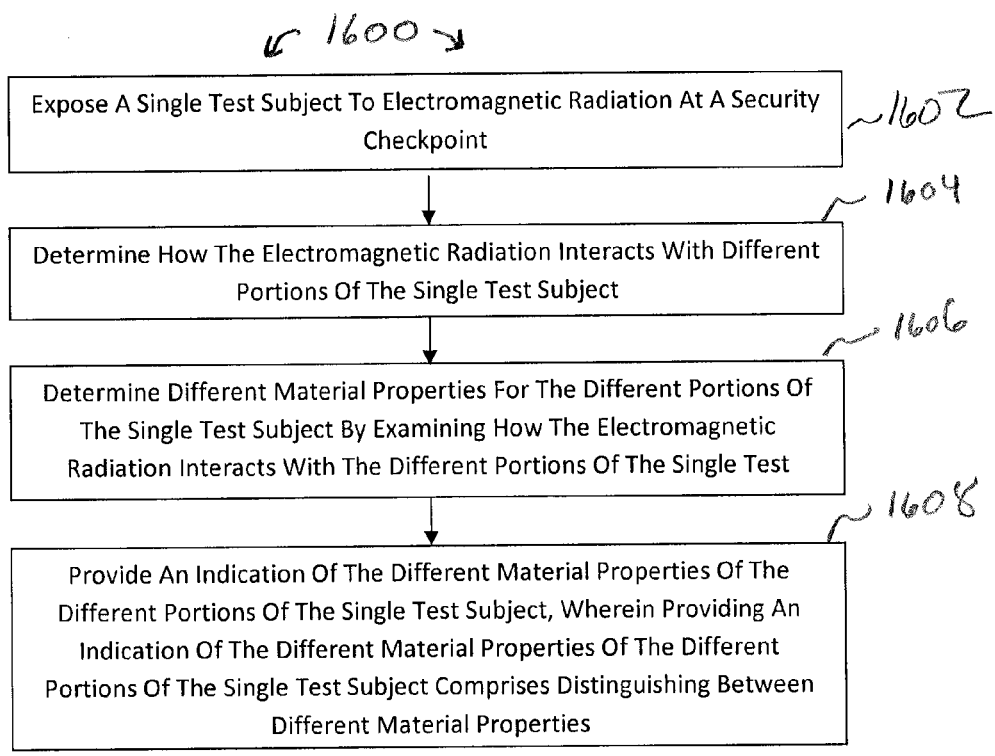
FIG. 16 illustrates a method for detecting characteristics of a test subject at a checkpoint.

Referring now to FIG. 16, a method 1600 is illustrated. The method 1600 includes acts for detecting characteristics of a test subject at a checkpoint. The method 1600 includes exposing a single test subject to electromagnetic radiation at a security checkpoint (act 1602). For example, the various antennas circuit illustrated above may be used to generate mm radiation which can be directed at a test subject. The test subject may have different properties for different portions of the test subject. For example, a test subject may include a human passenger and some plastic material on the human passenger's person.

The method 1600 further includes determining how the electromagnetic radiation interacts with different portions of the single test subject (act 1604). For example, portions of the radiation will be transmitted into portions the test subject, portions of the radiation will be reflected by portions of the test subject, etc.

The method 1600 further includes determining different material properties for the different portions of the single test subject by examining how the electromagnetic radiation interacts with the different portions of the single test subject (act 1606). For example, as illustrated above, different materials will interact with radiation differently. Thus, different materials can be detected by how the radiation interacts with them.

The method 1600 further includes providing an indication of the different material properties of the different portions of the single test subject (act 1608). Providing an indication of the different material properties of the different portions of the single test subject comprises distinguishing between different material properties.

The method 1600 may be practiced where providing an indication of the different material properties of the different portions of the single test subject comprises providing a quantitative indication of the different material properties. For example providing an indication of the different material properties of the different portions of the single test subject may include providing at least one of a colored image where different colors highlight different material properties, a gray scale image where different gray shades highlight different material properties; or a list of different material properties.

The method 1600 may further include using the indication to automatically detect contraband or security threats.

The method 1600 may be practiced where providing an indication of the different material properties of the different portions of the single test subject includes providing an indication of different dielectric constants of different portions of the single test subject.

The method 1600 may be practiced where providing an indication of the different material properties of the different portions of the single test subject includes providing an indication of different complex dielectric constants of different portions of the single test subject. Thus for example, some embodiments may be practiced where how the electromagnetic radiation interacts with different portions of the single test subject comprises determining complex dielectric constants by using inverse scattering analysis of the electromagnetic radiation.

The method 1600 may be practiced where providing an indication of the different material properties of the different portions of the single test subject includes providing an indication of different refractive indices of different portions of the single test subject.

The method 1600 may be practiced where providing an indication of the different material properties of the different portions of the single test subject includes providing an indication of different reflective indices of different portions of the single test subject.

The method 1600 may be practiced where exposing a single test subject to electromagnetic radiation at a security checkpoint includes exposing the test subject to both normally oriented electromagnetic radiation and obliquely oriented electromagnetic radiation.

The method 1600 may be practiced where exposing a single test subject to electromagnetic radiation at a security checkpoint comprises exposing the test subject to millimeter wave radiation.

The method 1600 may be practiced where the different material properties are detected at the granularity of a voxel.

The method of claim 12, wherein the voxel is at least ¼ wavelength of the electromagnetic radiation.

The method 1600 may be practiced where determining different material properties comprises detecting wavelength shifts of the electromagnetic radiation.

The method of claim 14, wherein detecting wavelength shifts of the electromagnetic radiation comprises using a chirp detector to detect wavelength shifts of the electromagnetic radiation. For example, detecting wavelength shifts of the electromagnetic radiation may include using a frequency step detector to detect wavelength shifts of the electromagnetic radiation.

The method 1600 may be practiced where determining different material properties comprises detecting frequency shifts of the electromagnetic radiation Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of detecting characteristics of a test subject at a checkpoint, the method comprising:
    exposing a single test subject to electromagnetic radiation at a security checkpoint;
    determining how the electromagnetic radiation interacts with different portions of the single test subject;
    determining different material properties for the different portions of the single test subject by examining how the electromagnetic radiation interacts with the different portions of the single test subject, wherein determining different material properties comprises detecting wavelength shifts of the electromagnetic radiation; and
    providing an indication of the different material properties of the different portions of the single test subject, wherein providing an indication of the different material properties of the different portions of the single test subject comprises distinguishing between different material properties.

2. The method of claim 1, wherein providing an indication of the different material properties of the different portions of the single test subject comprises providing a quantitative indication of the different material properties.

3. The method of claim 1, wherein providing an indication of the different material properties of the different portions of the single test subject comprises providing at least one of a colored image where different colors highlight different material properties, a gray scale image where different gray shades highlight different material properties; or a list of different material properties.

4. The method of claim 1, further comprising using the indication to automatically detect contraband or security threats.

5. The method of claim 1, wherein providing an indication of the different material properties of the different portions of the single test subject comprises providing an indication of different dielectric constants of different portions of the single test subject.

6. The method of claim 1, wherein providing an indication of the different material properties of the different portions of the single test subject comprises providing an indication of different complex dielectric constants of different portions of the single test subject.

7. The method of claim 6, wherein determining how the electromagnetic radiation interacts with different portions of the single test subject comprises determining complex dielectric constants by using inverse scattering analysis of the electromagnetic radiation.

8. The method of claim 1, wherein providing an indication of the different material properties of the different portions of the single test subject comprises providing an indication of different refractive indices of difThrent portions of the single test subject.

9. The method of claim 1, wherein providing an indication of the different material properties of the different portions of the single test subject comprises providing an indication of different reflective indices of different portions of the single test subject.

10. The method of claim 1, wherein exposing a single test subject to electromagnetic radiation at a security checkpoint comprises exposing the test subject to both normally oriented electromagnetic radiation and obliquely oriented electromagnetic radiation.

11. The method of claim 1, wherein exposing a single test subject to electromagnetic radiation at a security checkpoint comprises exposing the test subject to millimeter wave radiation.

12. The method of claim 1, wherein the different material properties are detected at the granularity of a voxel.

13. The method of claim 12, wherein the voxel is at least $1;4$ wavelength of the electromagnetic radiation.

14. The method of claim 1, wherein detecting wavelength shifts of the electromagnetic radiation comprises using a chirp detector to detect wavelength shifts of the electromagnetic radiation.

15. The method of claim 1, wherein detecting wavelength shifts of the electromagnetic radiation comprises using a frequency step detector to detect wavelength shills of the electromagnetic radiation.

16. The method of claim 1, wherein determining different material properties comprises detecting frequency shifts of the electromagnetic radiation.

17. A system for detecting characteristics of a test subject at a checkpoint, the system comprising:
    one or more processors; and
    one or more computer readable media, wherein the one or more computer readable media comprise computer executable instructions that when executed by at least one of the one or more processors cause at least one of the one or more processors to perform the following:
        exposing a single test subject to electromagnetic radiation at a security checkpoint;
        determining how the electromagnetic radiation interacts with different portions of the single test subject;
        determining different material properties tbr the different portions of the single test subject by examining how the electromagnetic radiation interacts with the different portions of the single test subject wherein determining different material properties comprises detecting wavelength shifts of the electromagnetic radiation; and
        providing an indication of the different material properties of the different portions of the single test subject, wherein providing an indication of the different material properties of the different portions of the single Lest subject comprises distinguishing between different material properties.

18. A system for detecting characteristics of a test subject at a checkpoint, the system comprising:
    one or more transmitters configured to expose a single test subject to electromagnetic radiation at a security checkpoint;
    one or more receivers configured to capture at least a portion of the electromagnetic radiation; and
    one or more processors coupled to the one or more receivers, the one or more processors configured to:

determine how the electromagnetic radiation interacts with different portions of the single test subject;

determine different material properties for the different portions of the single test subject by examining how the electromagnetic radiation interacts with the different portions of the single test subject wherein determining different material properties comprises detecting wavelength shifts of the electromagnetic radiation; and provide an indication of the different material properties of the different portions of the single test subject, wherein providing an indication of the different material properties of the different portions of the single test subject comprises distinguishing between different material properties.

* * * * *